US009884541B2

(12) United States Patent
Ide

(10) Patent No.: US 9,884,541 B2
(45) Date of Patent: Feb. 6, 2018

(54) VEHICULAR DOOR STRUCTURE

(71) Applicant: TOYOTA JIDOSHA KABUSHIKI KAISHA, Toyota-shi, Aichi-ken (JP)

(72) Inventor: Toyoka Ide, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 162 days.

(21) Appl. No.: 14/424,686

(22) PCT Filed: Jun. 13, 2013

(86) PCT No.: PCT/JP2013/066400
§ 371 (c)(1),
(2) Date: Feb. 27, 2015

(87) PCT Pub. No.: WO2014/064959
PCT Pub. Date: May 1, 2014

(65) Prior Publication Data
US 2015/0251529 A1  Sep. 10, 2015

(30) Foreign Application Priority Data

Oct. 23, 2012 (JP) .................. 2012-234156

(51) Int. Cl.
*E06B 7/18* (2006.01)
*B60J 10/00* (2016.01)
(Continued)

(52) U.S. Cl.
CPC ............ *B60J 10/0094* (2013.01); *B60J 5/04* (2013.01); *B60J 10/22* (2016.02); *B60J 10/233* (2016.02);
(Continued)

(58) Field of Classification Search
CPC .. B60J 10/002; B60J 10/0025; B60J 10/0042; B60J 10/008; B60J 10/0094; B60J 10/085; B60J 10/0045; B60J 5/04
(Continued)

(56) References Cited

U.S. PATENT DOCUMENTS 7,197,850 B2 *  4/2007  Mizutani .................. B60J 10/24
                                                     49/475.1
8,479,450 B2 *  7/2013  Mori ........................ B60J 10/24
                                                     49/440
(Continued)

FOREIGN PATENT DOCUMENTS

JP    H04-297322 A    10/1992
JP    06-012140 U     2/1994
(Continued)

*Primary Examiner* — Jerry Redman
(74) *Attorney, Agent, or Firm* — Andrews Kurth Kenyon LLP

(57) ABSTRACT

There is provided a vehicular door structure that can enhance the effect of noise insulation for a noise gaining entrance from an end portion of a weather strip while ensuring the drainability by the weather strip. The vehicular door structure is provided with a weather strip body that is arranged along a lower edge portion of a door body, that has a hollow interior, that has communication holes communicating with a drainage hole at the lower edge portion of the door body, and that serves as a drainage channel. This weather strip body is provided with partition walls that partition the hollow interior, at a plurality of locations from an end portion of the weather strip body to the communication holes. The partition walls are provided with drainage portions that penetrate the partition walls to enable drainage, respectively.

11 Claims, 25 Drawing Sheets

(51) Int. Cl.

| | | |
|---|---|---|
| *B60J 5/04* | (2006.01) | |
| *B60J 10/22* | (2016.01) | |
| *B60J 10/23* | (2016.01) | |
| *B60J 10/246* | (2016.01) | |
| *B60J 10/25* | (2016.01) | |
| *B60J 10/36* | (2016.01) | |
| *B60J 10/50* | (2016.01) | |
| *B60J 10/86* | (2016.01) | |

(52) U.S. Cl.
 CPC ............ *B60J 10/246* (2016.02); *B60J 10/25* (2016.02); *B60J 10/36* (2016.02); *B60J 10/50* (2016.02); *B60J 10/86* (2016.02)

(58) Field of Classification Search
 USPC ........................................ 49/477.1
 See application file for complete search history.

(56) References Cited

U.S. PATENT DOCUMENTS

| | | | |
|---|---|---|---|
| 2001/0025451 A1* | 10/2001 | Nozaki | B60J 10/0011 49/341 |
| 2005/0235573 A1* | 10/2005 | Roush | B60J 10/0017 49/493.1 |
| 2006/0150521 A1* | 7/2006 | Henry | E06B 1/70 49/471 |
| 2012/0159858 A1* | 6/2012 | Mori | B60J 10/0031 49/476.1 |
| 2015/0251529 A1* | 9/2015 | Ide | B60J 10/002 49/476.1 |

FOREIGN PATENT DOCUMENTS

| | | |
|---|---|---|
| JP | 6-23811 U | 3/1994 |
| JP | H08-142673 A | 6/1996 |

* cited by examiner

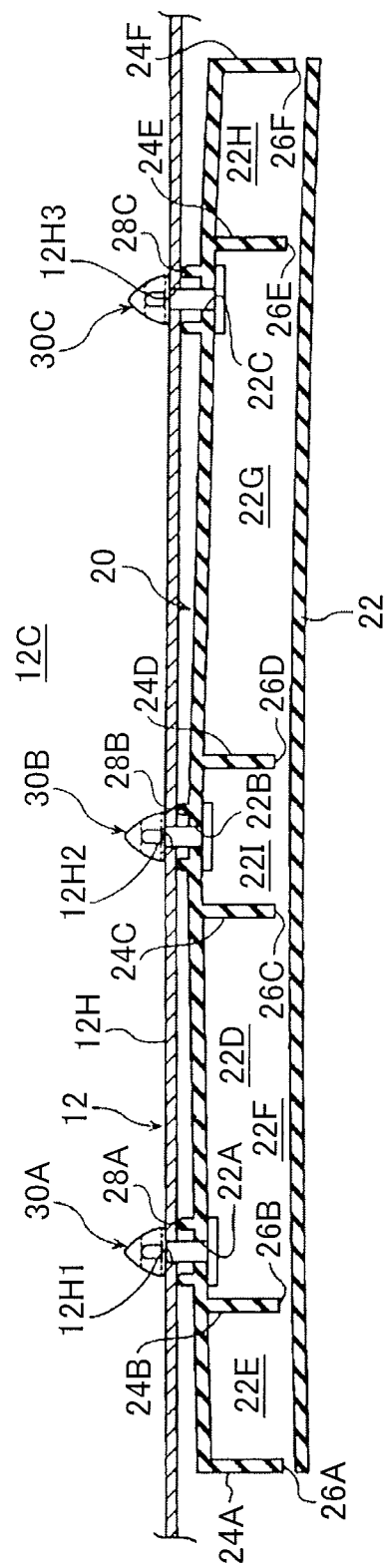

F I G . 18
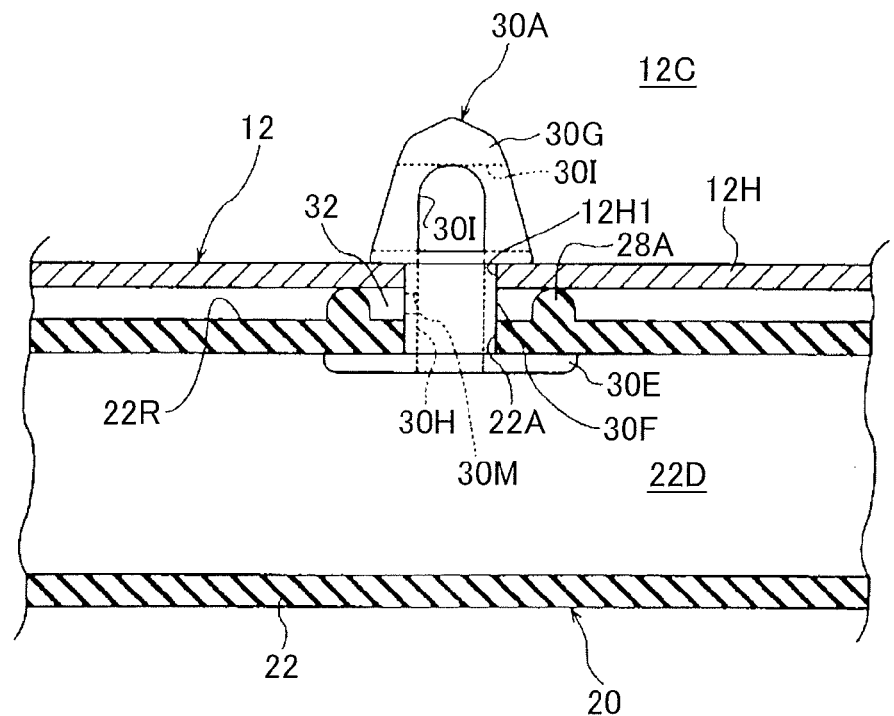
F I G . 19
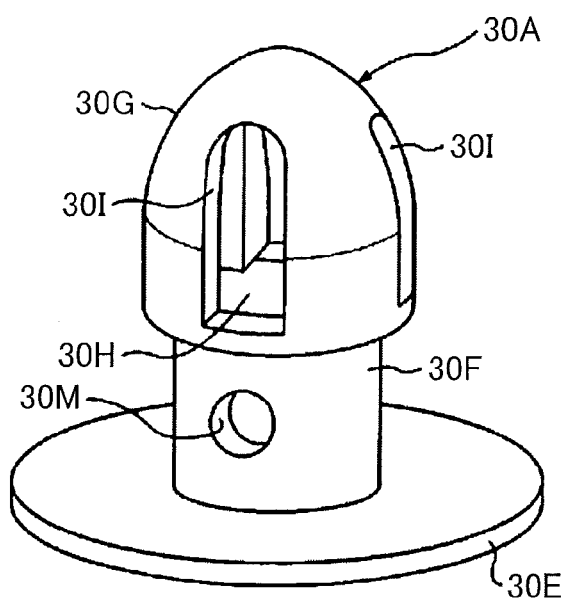

F I G . 29
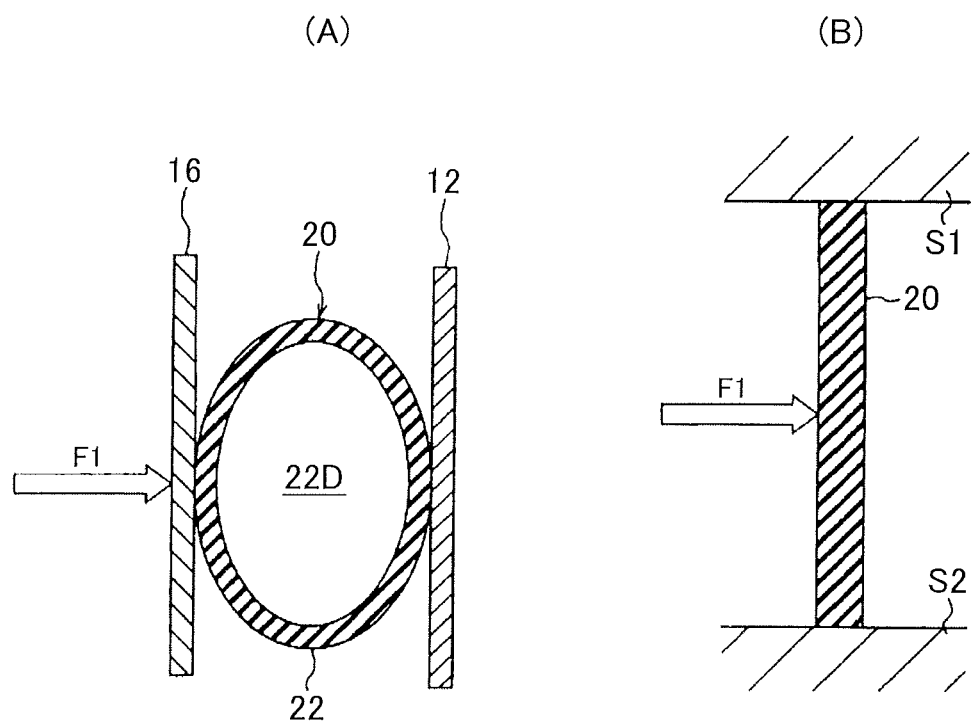

FIG. 30
(A)
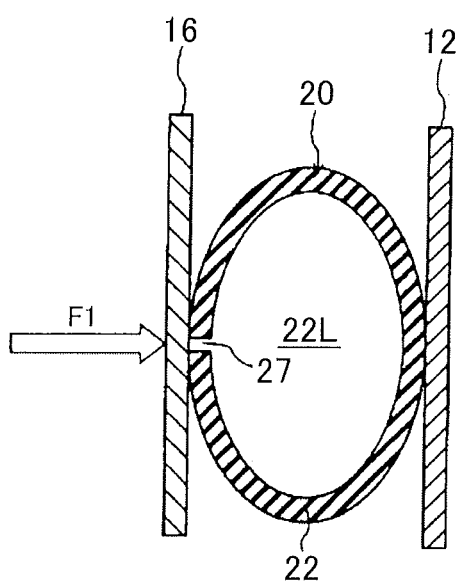
(B)
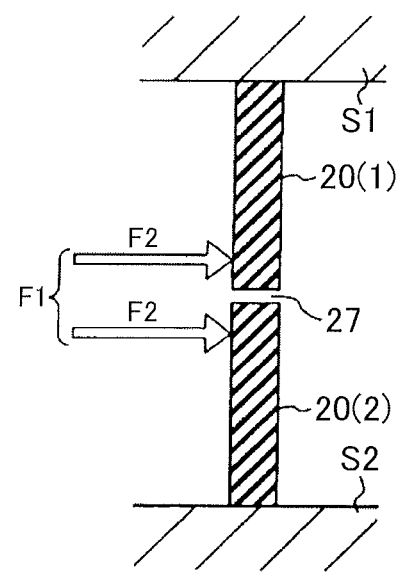

(A) (B) (C)

VEHICULAR DOOR STRUCTURE

CROSS-REFERENCE TO RELATED APPLICATIONS

This is a national phase application based on the PCT International Patent Application No. PCT/JP2013/066400 filed Jun. 13, 2013, claiming priority to Japanese Patent Application No. 2012-234156 filed Oct. 23, 2012, the entire contents of both of which are incorporated herein by reference.

TECHNICAL FIELD

The invention relates to a vehicular door structure, and more particularly, to a vehicular door structure that is equipped with a weather strip along a lower edge portion of a door body.

BACKGROUND ART

The Patent Document 1 shown below discloses a drainage structure for an automobile door in which a hollow weather strip is provided along a lower edge portion of a side door body of a vehicle body. With this drainage structure, a drainage hole that is provided at the lower edge portion of the side door body and a communication hole that is provided at an upper portion of the weather strip communicate with each other, and both ends of the weather strip are open.

According to the aforementioned configuration, the rainwater that has entered the side door body flows through the drainage hole and the communication hole together with dust, grime and dust-proof wax, while the interior of the weather strip serves as a drainage channel. This rainwater and the like are drained from openings at both the ends of the weather strip in a longitudinal direction thereof. Besides, with the aforementioned drainage structure, a noise entering the interior from a lateral portion of the side door body can be suppressed by the weather strip.

RELATED ART DOCUMENT

Patent Document

Patent Document 1: Japanese Patent Application Publication No. 8-142673 (JP-8-142673 A)

SUMMARY OF THE INVENTION

Problem to be Solved by the Invention

However, the noise gains entrance from the openings at both the ends of the weather strip. This noise enters a vehicle interior through the communication hole, the drainage hole, and the interior of the side door body. Therefore, there is room for improvement in the noise gaining entrance from the lower edge portion of the side door body.

In view of the aforementioned fact, it is an object of the invention to obtain a vehicular door structure that can ensure the drainability by a weather strip and that can enhance the effect of sound isolation for a noise gaining entrance from an end portion of the weather strip.

Means for Solving the Problem

A vehicular door structure according to the invention is equipped with a door body, a weather strip body, partition walls, and drainage portions. The door body is provided with a drainage hole at a lower edge portion thereof. The weather strip body is arranged along the lower edge portion, has a hollow interior, and also has a communication hole through which the interior and the drainage hole communicate with each other. The partition walls are provided at a plurality of locations from an end portion of the weather strip body to the communication hole, and partition the interior. The drainage portions partially penetrate the partition walls to enable drainage.

With the vehicular door structure, the drainage hole of the door body and the interior of the weather strip body communicate with each other through the communication hole, and the weather strip body has the hollow interior. Furthermore, the partition walls inside the weather strip body are provided with the drainage portions that partially penetrate the partition walls to enable drainage. Therefore, the water and the like that have entered the interior of the weather strip body through the drainage hole of the door body flow through the interior, which serves as a drainage channel, and are drained from the end portion of the weather strip body through the drainage portions.

It should be noted herein that the weather strip body is provided with the partition walls at the plurality of the locations from the end portion to the communication hole. In combination with an inner wall inside the weather strip body, these partition walls constitute a sound expansion chamber. A noise that has entered the expansion chamber from the end portion of the weather strip body through the drainage portions of the partition walls can be attenuated in this expansion chamber through acoustic wave interference. The attenuated noise enters the vehicle interior via the door body, from the expansion chamber through the drainage portions of the partition walls, the communication hole, and the drainage hole. Accordingly, the noise gaining entrance from the end portion of the weather strip body is effectively attenuated, so the effect of noise insulation can be enhanced.

A vehicular door structure is obtained by modifying claim 1 such that the weather strip body has a division structure that is divided in a longitudinal direction between the end portion and the communication hole, and that the partition walls are provided at division positions of the weather strip body respectively.

With the vehicular door structure, the weather strip body is configured such that the partition walls are provided in the hollow interior thereof. Therefore, it is difficult to manufacture the weather strip body through extrusion or injection molding.

It should be noted herein that a hollow weather strip body that has no partition wall therein can be easily manufactured through extrusion or injection molding. This weather strip body has the division structure that is divided in the longitudinal direction, so the partition walls can be provided at the division positions of the weather strip body respectively. Accordingly, the weather strip body having the partition walls can be easily manufactured.

A vehicular door structure such that the weather strip body is equipped, between the end portion and the communication hole, with an insertion groove that penetrates from an outer peripheral surface to the interior, and that the partition walls are inserted into the interior from the insertion groove.

With the vehicular door structure, the weather strip body is configured such that the partition walls are provided in the hollow interior thereof. Therefore, it is difficult to manufacture the weather strip body through extrusion or injection molding.

It should be noted herein that a hollow weather strip body having no partition wall therein can be easily manufactured through extrusion or injection molding. This weather strip body is equipped, between the end portion and the communication hole, with the insertion groove that penetrates from the outer peripheral surface to the interior. The partition walls are inserted into the interior from this insertion groove. Accordingly, the weather strip body having the partition walls can be easily manufactured.

A vehicular door structure such that the lower edge portion has a lateral wall as a flat surface, and that the weather strip body is constituted of an upper wall portion as a flat surface that is attached to the lateral wall, and a curved wall portion that assumes an arc-like shape as viewed from ahead of the vehicle.

With the vehicular door structure, the lateral wall at the lower edge portion of the door body is the flat surface. The upper wall portion as the flat surface of the weather strip body is attached to this lateral wall. Therefore, the weather strip body is stably attached to the lower edge portion.

A vehicular door structure is equipped with a door body, a weather strip body, partition walls, and drainage portions. The door body is provided with a drainage hole at a lower edge portion thereof. The weather strip body is arranged along the lower edge portion, has a hollow interior, also has a communication hole through which the interior and the drainage hole communicate with each other, and has a partially open cross-section in a direction intersecting with a longitudinal direction except at a location where the communication hole is formed. The partition walls are provided at a plurality of locations from an end portion of the weather strip body to the communication hole, and partition the interior. The drainage portions partially penetrate the partition walls to enable drainage.

With the vehicular door structure, an operation similar to that obtained by the foregoing vehicular door structure. Furthermore, the weather strip body has the partially open cross-section in the direction intersecting with the longitudinal direction thereof.

It should be noted herein that the spring constant of a weather strip body having an open cross-section is smaller than the spring constant of a weather strip body having a closed cross-section, so the reactive force of the former is smaller than the reactive force of the latter. Therefore, the reactive force of the weather strip body becomes small when the door body is closed, so the closing performance of the door body can be enhanced.

A vehicular door structure such that the lower edge portion has a lateral wall as a flat surface, and that the weather strip body is equipped with a flat upper wall portion that is attached to the lateral wall, a first longitudinal wall portion that extends downward with respect to the vehicle from a vehicle inner end of the upper wall portion, and a second longitudinal wall portion that extends downward with respect to the vehicle from a vehicle outer end of the upper wall portion parallel to the first longitudinal wall portion.

With the vehicular door structure, an operation similar to that obtained by the foregoing vehicular door structure can be obtained. Furthermore, the weather strip body is equipped with the upper wall portion, the first longitudinal wall portion, and the second longitudinal wall portion, and the weather strip body having the open cross-section with the first longitudinal wall portion and the second longitudinal wall portion open on the vehicle lower side is constituted.

Therefore, the spring constant of the weather strip body is reduced, so the closing performance of the door body can be enhanced.

A vehicular door structure such that the partition walls are provided integrally with the weather strip body.

With the vehicular door structure, the weather strip body has the open cross-section, so the partition walls can be provided integrally with the weather strip body. For example, the weather strip body and the partition walls can be manufactured by carrying out injection molding once with the aid of a die for molding an inner wall of the weather strip body and the partition walls, and a die for molding an outer wall of the weather strip body. Accordingly, the weather strip body can be simplified in structure.

A vehicular door structure such that the drainage portions are provided on a lowest side of the weather strip body with respect to the vehicle, in a state of being attached to the door body.

With the vehicular door structure, the drainage portions are provided on the lowest side of the weather strip body with respect to the vehicle. Therefore, drainage water is prevented from accumulating inside the weather strip body.

A vehicular door structure in such a manner as to further include a clip that has a primary through-hole that penetrates from the drainage hole to the communication hole to enable drainage from the door body to the weather strip body, and that clips the lower edge portion and the weather strip body via the drainage hole and the communication hole.

With the vehicular door structure, the clip that clips the lower edge portion and the weather strip body via the drainage hole and the communication hole is provided. The weather strip body is fixed to the lower edge portion by this clip. The clip is provided with the primary through-hole that penetrates the drainage hole and the communication hole to enable drainage from the door body to the weather strip body. Therefore, the weather strip body is reliably fixed to the lower edge portion of the door body, and drainage from the door body to the weather strip body through the primary through-hole is ensured.

A vehicular door structure such that the clip is equipped with a first engagement portion that is engaged with the weather strip body, a tube portion that is extended upward with respect to the vehicle from the first engagement portion and that has the primary through-hole therein, and a second engagement portion that is provided at an upper end of the tube portion and that is engaged with the lower edge portion, and that the first engagement portion, the tube portion, and the second engagement portion are molded integrally with one another.

A vehicular door structure such that the drainage hole is equipped with a first drainage hole and a second drainage hole that are disposed at a plurality of locations along the lower edge portion, and that the communication hole is equipped with a first communication hole that is arranged at the end portion of the weather strip body and that communicates with the first drainage hole, and a second communication hole that is arranged at a central portion of the weather strip body and that communicates with the second drainage hole, and in such a manner as to further include a first sealing portion, a second sealing portion, a first clip, and a second clip. The first sealing portion seals peripheries of the first drainage hole and the first communication hole between the lower edge portion and the end portion. The second sealing portion seals peripheries of the second drainage hole and the second communication hole between the lower edge portion and the central portion, and has a shorter spacing distance between the lower edge portion and the weather strip body than the first sealing portion. The first clip has a first primary through-hole that penetrates from the first drainage hole to the first communication hole to enable drainage from the door body to the weather strip body. The first clip clips the lower edge portion and the end portion via the first drainage hole and the first communication hole. The second clip has a second primary through-hole that penetrates from the second drainage hole to the second communication hole to enable drainage from the door body to the weather strip body and that has a shorter penetration length than the first through-hole. The second clip clips the lower edge portion and the central portion via the second drainage hole and the second communication hole.

With the vehicular door structure, the lower edge portion and the end portion of the weather strip body are fixed to each other by the first clip via the first sealing portion. The first drainage hole and the first communication hole communicate with each other through the first primary through-hole of the first clip. On the other hand, the lower edge portion and the central portion of the weather strip body are fixed to each other by the second clip via the second sealing portion that has a shorter spacing distance than the first sealing portion. The second drainage hole and the second communication hole communicate with each other through the second primary through-hole that has a shorter penetration length than the first primary through-hole of the second clip. Therefore, a downward inclination is set for the weather strip body from the central portion toward the end portion. Accordingly, drainage is reliably carried out from the central portion toward the end portion of the weather strip body.

A vehicular door structure in such a manner as to further include a sealing portion and a clip. The sealing portion seals peripheries of the drainage hole and the communication hole between the lower edge portion and the weather strip body, and forms a closed space between the lower edge portion and the weather strip body. The clip has a primary through-hole that penetrates from the drainage hole to the communication hole to enable drainage from the door body to the weather strip body, and a secondary through-hole that penetrates from the primary through-hole to the closed space. The clip clips the lower edge portion and the weather strip body via the drainage hole and the communication hole.

With the vehicular door structure, the sealing portion that forms the closed space between the lower edge portion and the weather strip body is provided, and the clip having the primary through-hole through which the drainage hole and the communication hole communicate with each other and the secondary through-hole that leads to the closed space from the primary through-hole is provided.

It should be noted herein that there is structured "a spring-mass system with one degree of freedom" with the air in the closed space serving as "a spring" and with the air in the secondary through-hole of the clip serving as "a mass". When a sound passing through the primary through-hole of the clip hits "the mass", "the spring" vibrates. Therefore, at least part of acoustic energy can be converted into vibrational energy. Therefore, a noise gaining entrance from the end portion of the weather strip body is effectively attenuated when passing through the clip, so the effect of noise insulation can be further enhanced. Besides, the attenuation of the noise by "the spring-mass system with one degree of freedom" is unsusceptible to the frequency of the noise. As a result, the enhancement of the effect of noise insulation is stably achieved.

Effects of the Invention

With the vehicular door structure, an excellent effect of making it possible to ensure the drainability by the weather strip and enhance the effect of noise insulation for a noise gaining entrance from the end portion of the weather strip is obtained.

With the vehicular door structure, an excellent effect of making it possible to easily manufacture the weather strip is obtained in addition to the effect obtained by the vehicular door structure.

With the vehicular door structure, an excellent effect of stably attaching the weather strip to the lower edge portion of the door body is obtained.

With the vehicular door structure, an excellent effect of making it possible to enhance the closing performance of the door body is obtained in addition to the effect obtained by the vehicular door structure.

With the vehicular door structure, an excellent effect of stably attaching the weather strip to the lower edge portion of the door body and making it possible to enhance the closing performance of the door body is obtained.

With the vehicular door structure, an excellent effect of making it possible to further ensure the drainability by the weather strip is obtained With the vehicular door structure, an excellent effect of making it possible to reliably fix the weather strip to the lower edge portion of the door body is obtained, in addition to the effect obtained by the vehicular door structure.

With the vehicular door structure, an excellent effect of making it possible to simplify the configuration of the clip for fixing the weather strip to the lower edge portion of the door body is obtained, With the vehicular door structure, an excellent effect of making it possible to enhance the drainage performance of the weather strip is obtained in addition to the effect obtained by the vehicular door structure.

With the vehicular door structure, an excellent effect of making it possible to reliably fix the weather strip to the lower edge portion of the door body and further enhance the effect of noise insulation without being affected by the frequency of a noise is obtained, in addition to the effect obtained by the vehicular door structure.

BRIEF DESCRIPTION OF THE DRAWINGS

FIG. 10(A) is a perspective view of a weather strip body that has been extruded. FIG. 10(B) is an enlarged perspective view of an essential part of the weather strip body that has been perforated. FIG. 10(C) is an enlarged perspective view of the essential part of the weather strip body that has been divided. FIG. 10(D) is a perspective view of a partition wall and a sealing member that are fitted to the weather strip body. FIG. 10(E) is an enlarged perspective view of an essential part showing a fitting state of the partition wall and the sealing member to the weather strip body.

FIG. 11(A) is an enlarged perspective view of an essential part of the weather strip body that has been trimmed. FIG. 11(B) is an enlarged cross-sectional view of the weather strip body that has been cut along a cutting line D-D (a trimming region) shown in FIG. 11(A). FIG. 11(C) is a perspective view of the partition wall and the sealing member that are fitted to the weather strip body. FIG. 11(D) is an enlarged perspective view of an essential part showing a fitting state of the partition wall and the sealing member to the weather strip body.

FIG. 15 is a cross-sectional view of a weather strip of a vehicular door structure according to a third embodiment of the invention, and corresponds to FIG. 8.

FIG. 18 is an enlarged cross-sectional view of an essential part of a weather strip of a vehicular door structure according to a fourth embodiment of the invention, and corresponds to FIG. 13.

FIG. 19 is a perspective view of a clip shown in FIG. 18, as viewed diagonally downward from above.

FIG. 29(A) is a schematic view showing a state where a weather strip having a closed cross-section is arranged between a door body and a rocker molding, as viewed from a vehicle front side toward a vehicle rear side. FIG. 29(B) is a model view obtained by substituting a beam model for a conceptual view shown in this FIG. 29(A).

FIG. 30(A) is a schematic view showing a state where a weather strip having an open cross-section is arranged between a door body and a rocker molding, as viewed from a vehicle front side toward a vehicle rear side. FIG. 30(B) is a model view that is obtained by substituting a beam model for a conceptual view shown in this FIG. 30(A).

MODES FOR CARRYING OUT THE INVENTION

Figure 1:
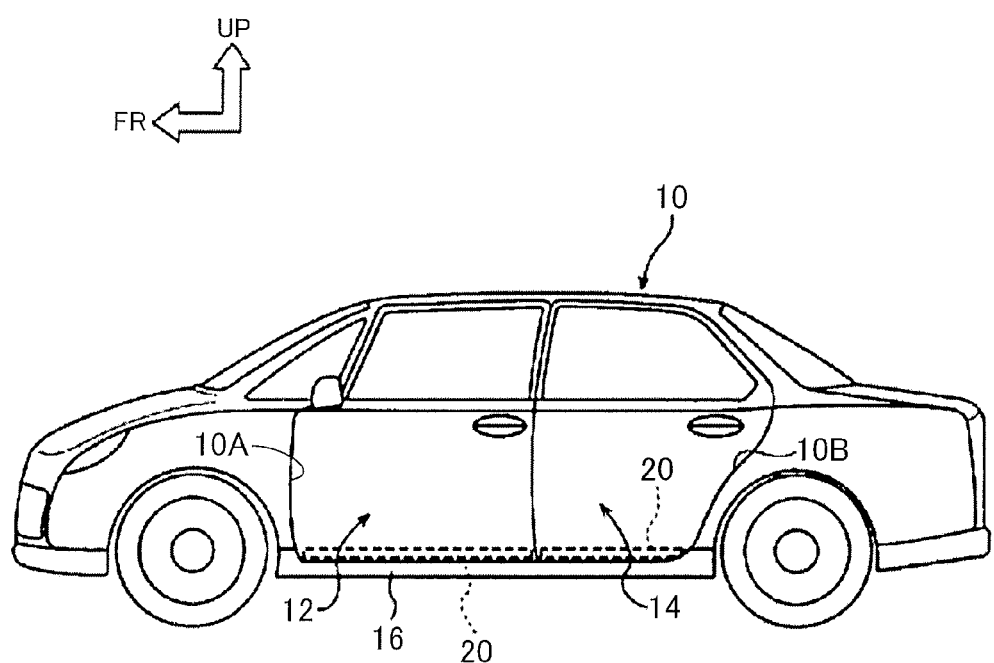
FIG. 1 is a left lateral view of a vehicle that is equipped with a vehicular door structure according to a first embodiment of the invention.

Embodiments of a vehicular door structure according to the invention will be described hereinafter with reference to the drawings. Incidentally, an arrow FR shown in the drawings as appropriate indicates a vehicle front side, and an arrow UP indicates a vehicle upper side. Besides, an arrow W indicates a vehicle width direction.

First Embodiment (Configuration of Vehicular Door Structure)

FIG. 1 shows a lateral surface of a general sedan-type vehicle 10, as viewed from the left side. A swing-type front side door body 12 that can be opened/closed with respect to a front door opening 10A is provided on the left lateral surface of the vehicle 10 and on the vehicle front side. By the same token, a swing-type rear side door body 14 that can be opened/closed with respect to a rear door opening 10B is provided on the left lateral surface of the vehicle 10 and behind the front side door body 12 with respect to the vehicle. The vehicular door structure according to the invention is applied to both the aforementioned front side door body 12 and the aforementioned rear side door body 14, and they are both identical in structure. Therefore, only the front side door body 12 side will be described hereinafter.

Figure 5:
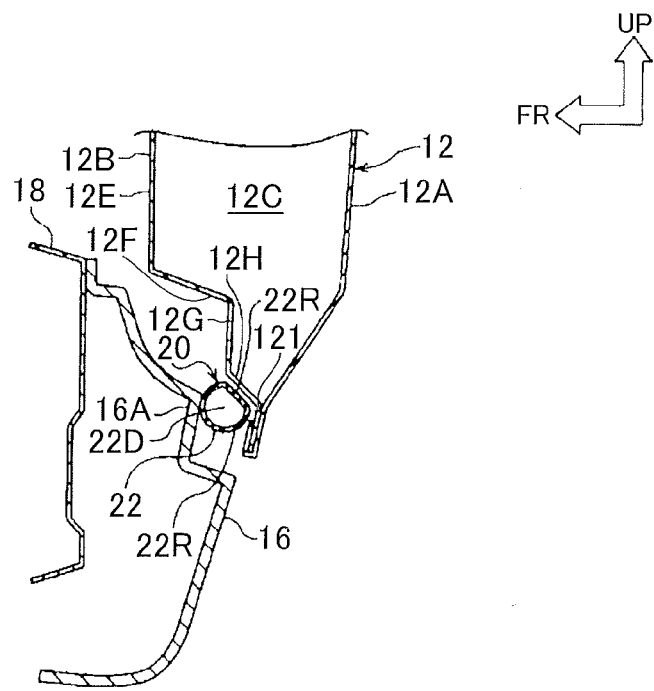
FIG. 5 is a cross-sectional view of a door body taken along a cutting line A-A of the weather strip shown in FIG. 4, as viewed from a vehicle front side toward a vehicle rear side.
Figure 6:
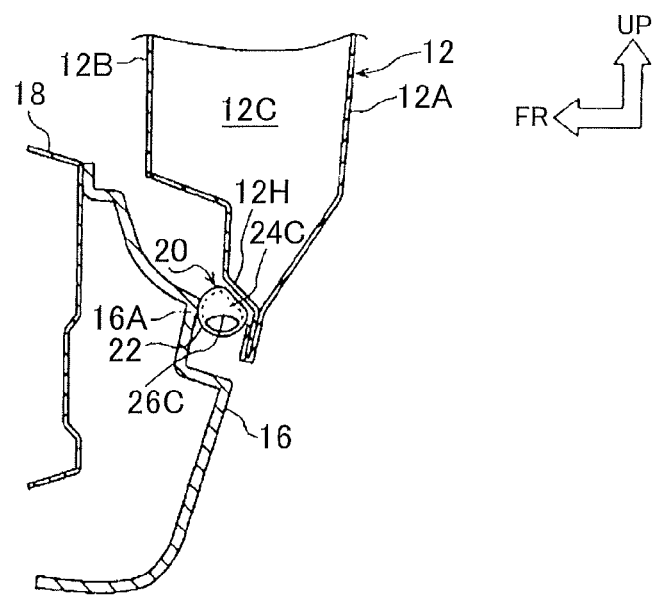
FIG. 6 is a cross-sectional view of the door body taken along a cutting line B-B of the weather strip shown in FIG. 4, as viewed from the vehicle front side toward the vehicle rear side.

As shown in FIG. 5, the front side door body 12 is equipped with a door outer panel 12A that is arranged outside a vehicle interior in a vehicle width direction, and a door inner panel 12B that is arranged inside the door outer panel 12A in the vehicle width direction and that constitutes a closed cross-section in combination with the door outer panel 12A. Incidentally, a door interior 12C of this front side door body 12 is a space.

The door inner panel 12B is constituted of a first longitudinal wall 12E that is provided along a vehicle vertical direction and a vehicle longitudinal direction, a first lateral wall 12F that is flexed outward in the vehicle width direction from a lower end of the first longitudinal wall 12E, a second longitudinal wall 12G that is flexed downward with respect to the vehicle from an outer end of the first lateral wall 12F, a second lateral wall 12H that is flexed outward in the vehicle width direction from a lower end of the second longitudinal wall 12G, and a third longitudinal wall 12I that is flexed downward with respect to the vehicle from an outer end of the second lateral wall 12H. A lower end portion of the door outer panel 12A is folded back onto the third longitudinal wall 12I through hemming and joined thereto. Incidentally, a door trim (not shown) as a design surface is attached inside the door inner panel 12B in the vehicle width direction.

As shown in FIG. 5, a rocker 18 that has a closed cross-section with a hollow interior and that is extended in the vehicle longitudinal direction is provided inside the lower edge portion of the front side door body 12 in the vehicle width direction. A rocker molding 16 that is extended along the vehicle longitudinal direction and that has a longitudinal wall 16A in an intermediate region thereof in the vehicle vertical direction is provided outside this rocker 18 in the vehicle width direction.

As shown in FIG. 1 and FIGS. 5 to 7, with the front door opening 10A closed down by the front side door body 12, an under-door weather strip (hereinafter referred to simply as "a weather strip") 20 is interposed between the second lateral wall 12H at the lower edge portion of the front side door body 12 and the longitudinal wall 16A of the rocker molding 16, along the lower edge portion of the front side door body 12. Specifically, the weather strip 20 is attached to the second lateral wall 12H of the front side door body 12.

(Configuration of Weather Strip)

Figure 2:
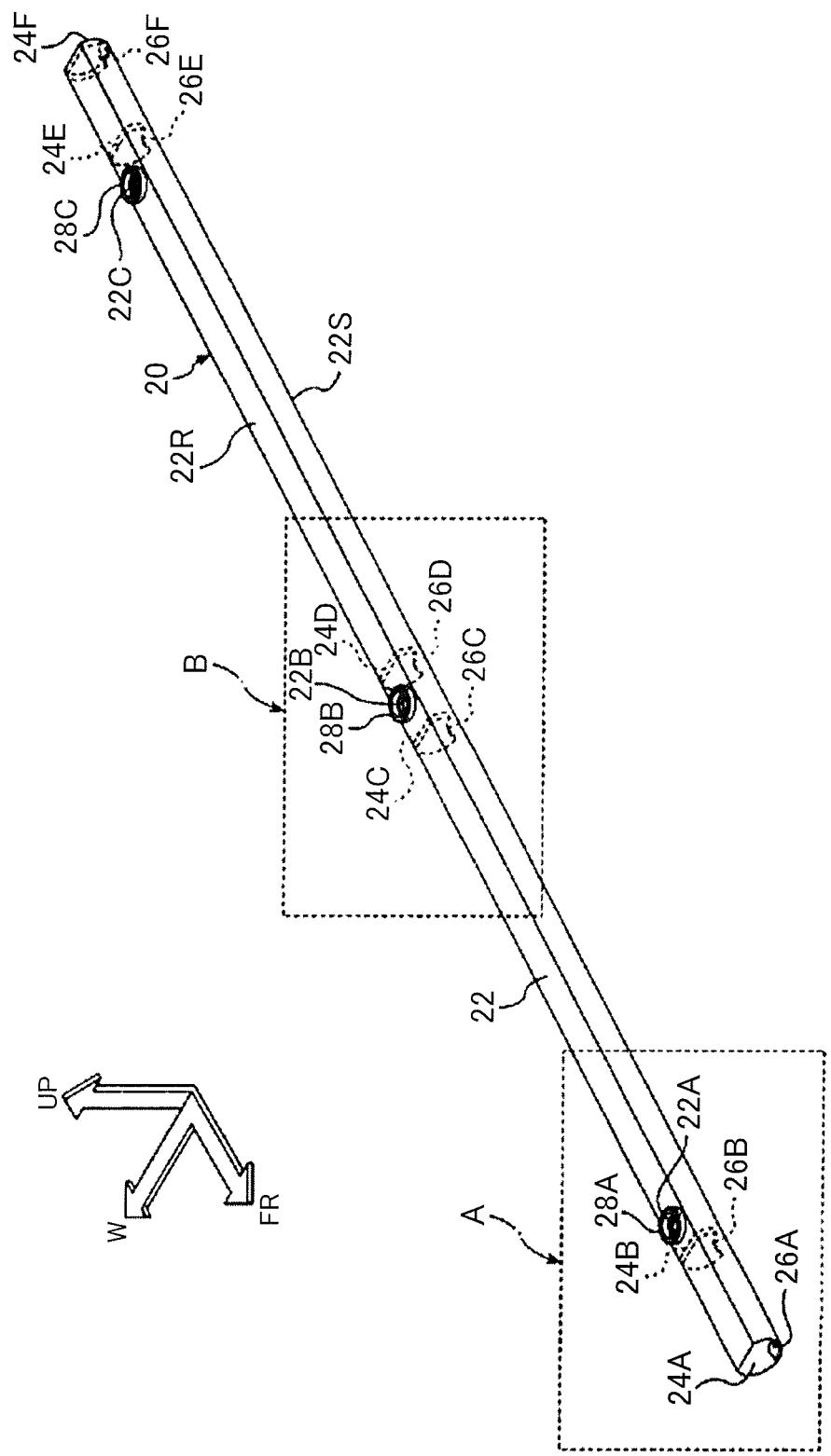
FIG. 2 is a perspective view of a weather strip of the vehicular door structure shown in FIG. 1.
Figure 3:
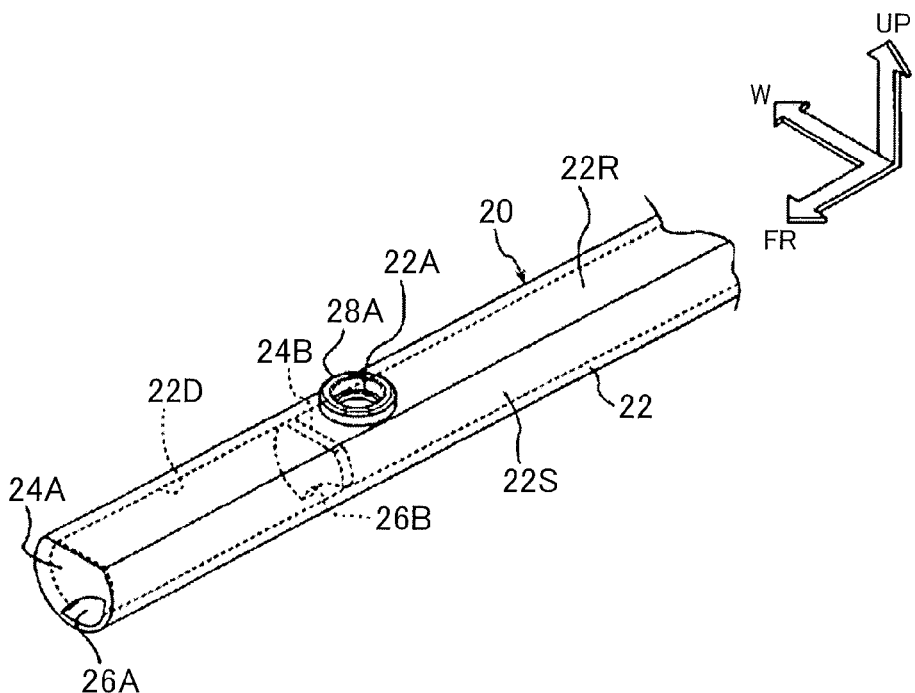
FIG. 3 is an enlarged perspective view of the weather strip shown in FIG. 2, in a region that is denoted by a reference symbol A and surrounded by a broken line.
Figure 4:
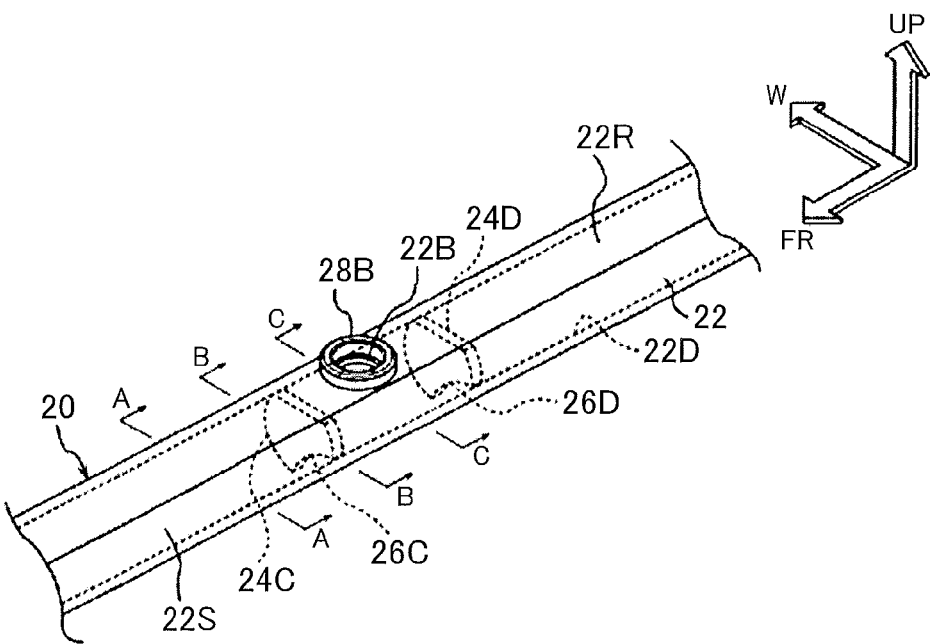
FIG. 4 is an enlarged perspective view of the weather strip shown in FIG. 2, in a region that is denoted by a reference symbol B and surrounded by a broken line.

As shown in FIGS. 2 to 4, the weather strip 20 is basically constituted by a weather strip body 22 that has a hollow cross-section having an inner space 22D as viewed from ahead of the vehicle, that is formed elongated along the second lateral wall 12H of the front side door body 12, and that is open at both ends thereof. A cross-section obtained by cutting this weather strip body 22 in a direction intersecting with (perpendicular to) the longitudinal direction thereof is a closed cross-section (having a closed cross-sectional shape with an outer periphery that does not communicate with the inner space 22D) with no open region, except at locations where later-described communication holes 22A to 22C are formed. An upper wall portion 22R of the weather strip body 22 on the front side door body 12 side is a flat surface as is the case with the second lateral wall 12H as viewed from ahead of the vehicle, in order to enable stable attachment to the second lateral wall 12H. Except at the upper wall portion 22R, the weather strip body 22 is a curved wall portion 22S that assumes an arc-like shape as viewed from ahead of the vehicle. The weather strip body 22 functions as a drainage channel for draining the water, rainwater, grit, dust, antirust wax and the like (hereinafter simply abbreviated as "water and the like") that flow in from the door interior 12C of the front side door body 12 through drainage holes 12H1 to 12H3 (see FIG. 8), from both ends thereof. The weather strip body 22 is formed of a polymer elastic material, for example, chloroprene rubber, styrene-butadiene rubber, nitrile rubber, ethylene-propylene-diene rubber (EPDM) or the like.

Figure 7:
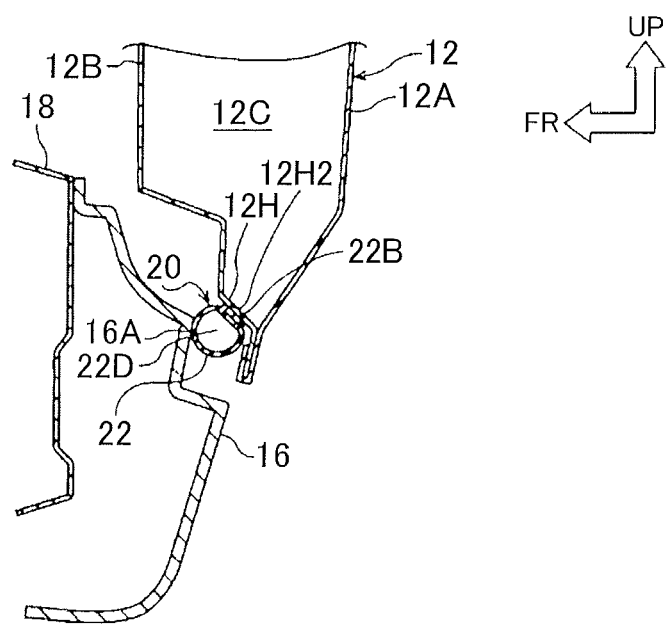
FIG. 7 is a cross-sectional view of the door body taken along a cutting line C-C of the weather strip shown in FIG. 4, as viewed from the vehicle front side toward the vehicle rear side.
Figure 8:
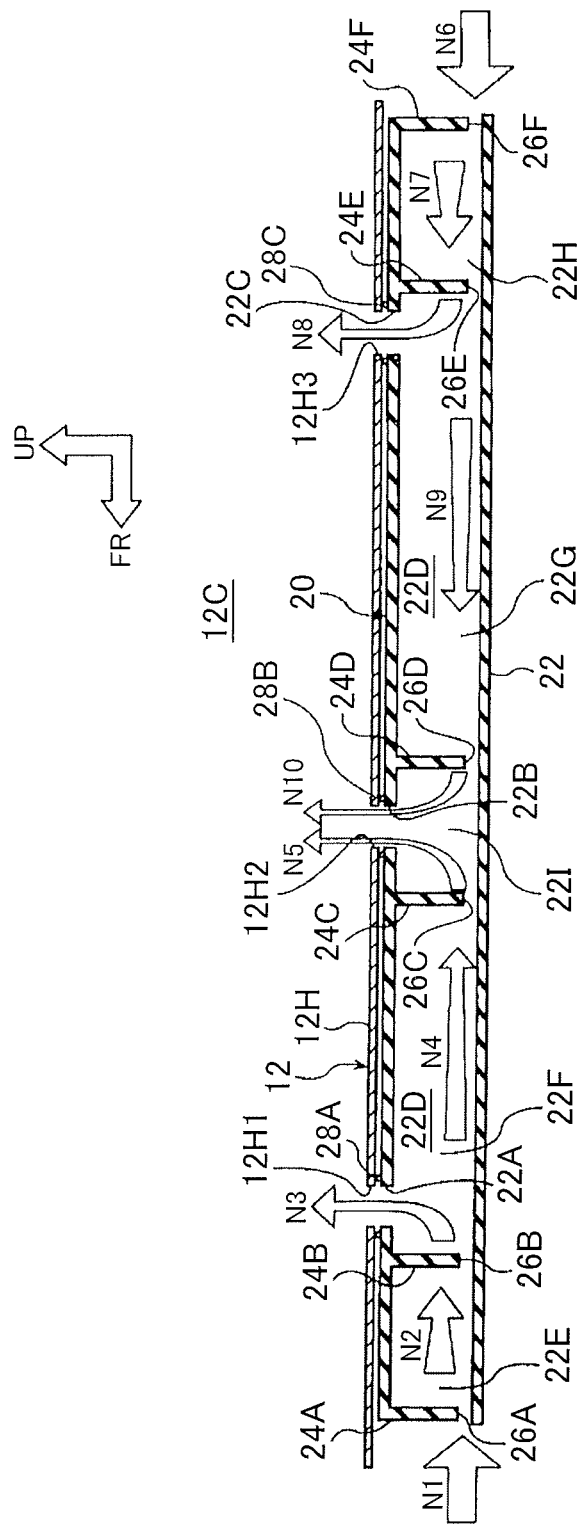
FIG. 8 is a cross-sectional view of the weather strip shown in FIG. 2, as viewed from a vehicle lateral surface side.

As shown in FIGS. 7 and 8, a total of three drainage holes 12H1 to 12H3 that penetrate from the door interior 12C to the outside and that assume, for example, a substantially circular shape in a plan view of the vehicle are provided at a plurality of locations of the second lateral wall 12H of the door inner panel 12B along the lower edge portion of the front side door body 12. It should be noted herein that the drainage hole 12H1 is provided on a front end side of the front side door body 12 in the vehicle longitudinal direction. Besides, the drainage hole 12H2 is provided at an intermediate portion of the front side door body 12 in the vehicle longitudinal direction. Furthermore, the drainage hole 12H3 is provided on a rear end side of the front side door body 12 in the vehicle longitudinal direction. Incidentally, the number of these drainage holes 12H1 to 12H3 should not be limited in particular in the invention.

The weather strip 20 is provided with a communication hole 22A that is arranged at a position opposed to the drainage hole 12H1 of the upper wall portion 22R of the weather strip body 22, that communicates with the drainage hole 12H1, that penetrates the inner space 22D from an outer periphery thereof, and that assumes, for example, a substantially circular shape in a plan view of the vehicle. By the same token, a communication hole 22B is provided at a position corresponding to the drainage hole 12H2 of the upper wall portion 22R, and a communication hole 22C is provided at a position corresponding to the drainage hole 12H3.

The upper wall portion 22R of the weather strip body 22 is provided with a sealing portion 28A that is arranged between the upper wall portion 22R and the second lateral wall 12H, that assumes the shape of a ring surrounding the peripheries of the communication hole 22A and the drainage hole 12H1 in a plan view of the vehicle, and that seals the peripheries of the communication hole 22A and the drainage hole 12H1. The sealing portion 28A prevents drainage water from leaking from the drainage hole 12H1 to the communication hole 22A. The sealing portion 28A is formed as a separate member that is made of the same material as the weather strip body 22 in the present embodiment of the invention, and is fixed to the weather strip body 22 by an adhesive. By the same token, a sealing portion 28B that is identical in structure to the sealing portion 28A is provided around the communication hole 22B of the upper wall portion 22R. A sealing portion 28C that is identical in structure to the sealing portion 28A is provided around the communication hole 22C.

As shown in FIGS. 2 to 8, partition walls 24A to 24F are further provided at a plurality of locations in the longitudinal direction of the weather strip body 22. The partition walls 24A to 24F are arranged in such a manner as to partition the hollow interior 22D in a direction intersecting with (in this case, perpendicular to) the longitudinal direction, and are arranged apart from one another in the longitudinal direction of the weather strip body 22. Drainage portions 26A to 26F that penetrate in a board thickness direction to enable drainage of water and the like are provided at lower portions of the partition walls 24A to 24F respectively. The partition wall 24A is provided at one end (an end portion) of the weather strip body 22 on the vehicle front side, and the partition wall 24B is provided at a location that is between one end of the weather strip body 22 and the communication hole 22A and that is close to the communication hole 22A. That is, the two partition walls 24A and 24B are provided between one end of the weather strip body 22 and the communication hole 22A. The partition walls 24A and 24B partially partition (divide) the inner space 22D between one end of the weather strip body 22 and the communication hole 22A, and constitute an expansion chamber 22E in combination with an inner wall of the weather strip body 22.

Furthermore, the partition wall 24C is provided at a location that is between the partition wall 24B and the communication hole 22B at the central portion of the weather strip body 22 and that is close to the communication hole 22B. That is, the three partition walls 24A, 24B and 24C are provided between one end of the weather strip body 22 and the communication hole 22B. The partition walls 24B and 24C partially partition the inner space 22D of the weather strip body 22, and constitute an expansion chamber 22F in combination with the inner wall of the weather strip body 22. Incidentally, the two partition walls 24C and 24D, which are arranged in front of and behind the communication hole 22B with respect to the vehicle respectively, also partially partition the inner space 22D of the weather strip body 22 and seem to constitute an expansion chamber 22I, but do not exert a great effect.

On the other hand, the partition wall 24F is provided at the other end (an end portion) of the weather strip body 22 on the vehicle rear side, and the partition wall 24E is provided at a location that is between the other end of the weather strip body 22 and the communication hole 22C and that is close to the communication hole 22C. That is, the two partition walls 24F and 24E are provided at a plurality of locations from the other end of the weather strip body 22 to the communication hole 22C. The partition walls 24F and 24E partially partition the inner space 22D between the other end of the weather strip body 22 and the communication hole 22C, and constitute an expansion chamber 22H in combination with the inner wall of the hollow interior 22D. Furthermore, the partition wall 24D is provided at a location that is between the partition wall 24E and the communication hole 22B at the central portion of the weather strip body 22 and that is close to the communication hole 22B. That is, the three partition walls 24F, 24E and 24D are provided between the other end of the weather strip body 22 and the communication hole 22B. The partition walls 24E and 24D partially partition the inner space 22D of the weather strip body 22, and constitute an expansion chamber 22G in combination with the inner wall of the hollow interior 22D.

Incidentally, although not shown in the drawings, the weather strip 20 according to the first embodiment of the invention is bonded and fixed to the second lateral wall 12H through the use of adhesion means such as an adhesive, a double-faced adhesive tape or the like. Besides, the weather strip 20 may be attached and fixed to the second lateral wall 12H by a clip that communicates with a first clip stop hole that is provided at a position different from the drainage holes 12H1 to 12H3 of the second lateral wall 12H, and a second clip stop hole that is provided in the weather strip body 22 at a position corresponding to this first clip stop hole.

(First Method of Manufacturing Weather Strip)

Figures 10A, 10B, 10C, 10D, 10E:
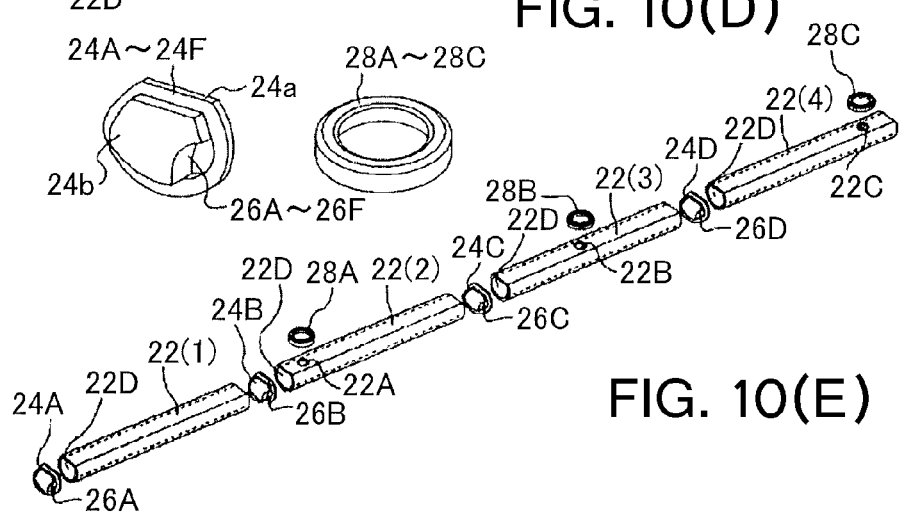
FIGS. 10(A) to 10(E) are perspective views of respective processes for illustrating a first method of molding the weather strip.

A first method of manufacturing the weather strip 20 according to the first embodiment of the invention is as follows. As shown in FIG. 10(A), first of all, the weather strip body 22 that is elongated, that has the hollow interior 22D, and that assumes a hollow closed cross-sectional shape is formed through extrusion (or injection molding). Subsequently, as shown in FIG. 10(B), the communication hole 22A that assumes a substantially circular shape is formed through the upper wall portion 22R of the weather strip body 22 at one end portion in the longitudinal direction thereof, through perforation. By the same token, the communication hole 22B is formed through the upper wall portion 22R of the weather strip body 22 at the central portion in the longitudinal direction thereof, and the communication hole 22C is formed through the upper wall portion 22R of the weather strip body 22 at the other end portion in the longitudinal direction thereof.

In order to provide the weather strip 20 with a division structure, as shown in FIG. 10(C), the weather strip body 22 is divided into a plurality of weather strip bodies 22(1), 22(2), 22(3), 22(4) etc., along a direction intersecting with (in this case, perpendicular to) the longitudinal direction, through division (cutting). At division locations of the weather strip body 22, the partition walls 24B to 24E are formed respectively. Specifically, the weather strip body 22 is divided into the weather strip bodies 22(1) and 22(2) at a location that is between one end of the weather strip body 22 and the communication hole 22A and that is close to the communication hole 22A. Besides, the weather strip body 22 is divided into the weather strip bodies 22(2) and 22(3) at a location that is on one end side with respect to the communication hole 22B. Moreover, the weather strip body 22 is divided in the same manner in the longitudinal direction.

On the other hand, as shown in FIG. 10(D), the partition walls 24A to 24F that partition (close up) the inner space 22D of the weather strip body 22 and the ring-shaped sealing members (the sealing portions) 28A to 28C are formed through, for example, injection molding. Each of the partition walls 24A to 24F is equipped with a plate-like partition wall body 24a that has the same contour as that of the divided cross-section of the weather strip body 22, and a protrusion region 24b that assumes a protrusive shape, that is formed integrally with the central portion of this partition wall body 24a, and that is fitted in the hollow interior 22D of the weather strip body 22. Furthermore, each of the partition walls 24A to 24F is provided with a corresponding one of the drainage portions 26A to 26F that is obtained by notching part of the protrusion region 24b and that penetrates the partition wall body 24a to enable drainage. In order to prevent drainage water from accumulating, the positions of the drainage portions 26A to 26F are set on the lowest side with respect to the vehicle, with the weather strip 20 attached to the front side door body 12. Besides, although not in a restrictive sense in particular, the opening area of the drainage portions 26A to 26F is preferably set to about half of the opening area of the drainage hole 12H1, because the water and the like drained from the drainage hole 12H1 (or 12H2 or 12H3) are drained from both the ends of the weather strip 20.

As shown in FIG. 10(E), the partition wall 24A is bonded and fixed to one end of the weather strip body 22(1) on the vehicle front side by an adhesive. Furthermore, the partition wall 24B is bonded and fixed between the other end of the weather strip body 22(1) on the vehicle rear side and one end of the weather strip body 22(2) on the vehicle front side, by an adhesive. A sealing member 28A is bonded and fixed to the periphery of the communication hole 22A of the weather strip body 22(2), by an adhesive. Hereinafter, by the same token, the partition walls 24C to 24E are bonded and fixed among divided portions of the weather strip body 22, and the partition wall 24F is bonded and fixed to the other end of the weather strip body 22 on the vehicle rear side. Furthermore, a sealing member 28B is bonded and fixed to the periphery of the communication hole 22B of the weather strip body 22, and a sealing member 28C is bonded and fixed to the periphery of the communication hole 22C.

After a series of these manufacturing processes end, the weather strip 20 manufactured according to the first manufacturing method is completed.

(Second Method of Manufacturing Weather Strip)

A second method of manufacturing the weather strip 20 according to the first embodiment of the invention is as follows. First of all, as is the case with the method of manufacturing the weather strip body 22 shown in the foregoing FIG. 10(A), the weather strip body 22 is formed through extrusion (or injection molding). Subsequently, as is the case with the method of manufacturing the communication holes 22A to 22C shown in the foregoing FIG. 10(B), the communication holes 22A to 22C are formed through the weather strip body 22 through perforation.

Figure 11A:
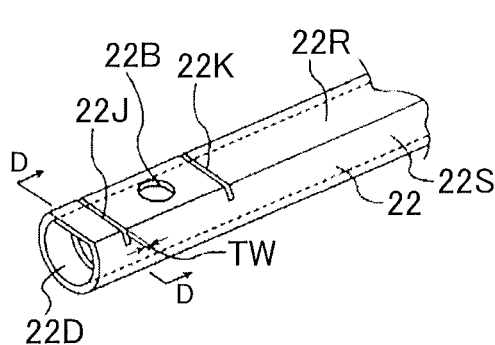
FIGS. 11(A) to 11(D) are views of respective processes for illustrating a second method of molding the weather strip.
Figure 11B:
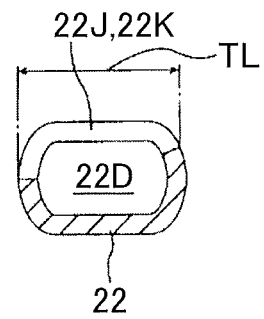

Subsequently, as shown in FIG. 11(A), insertion grooves 22J and 22K that penetrate from an outer peripheral surface of the weather strip body 22 to the hollow interior 22D are formed through part of the outer periphery of the weather strip body 22 in a direction intersecting with (in this case, perpendicular to) the longitudinal direction thereof, through trimming. In FIG. 11(A) and FIG. 11(D), which will be described later, a central region of the weather strip body 22 in the longitudinal direction, namely, an area around the communication hole 22B is shown in an extracted manner. The insertion groove 22J is provided at a location that is in front of the communication hole 22B of the weather strip body 22 with respect to the vehicle, and a groove width TW of the insertion groove 22J that coincides with the longitudinal direction of the weather strip body 22 is substantially equal to a thickness t (see FIG. 11(C)) of the partition wall 24C that is inserted into this insertion groove 22J. As shown in FIG. 11(B), with a view to allowing the partition wall 24C to be embedded in the inner space 22D from the outer periphery of the weather strip body 22, a groove length TL of the insertion groove 22J is set substantially equal to a maximum width BW of the partition wall 24C that is substantially perpendicular to the longitudinal direction of the weather strip body 22, or smaller than the maximum width BW because the weather strip body 22 is elasticized. The insertion groove 22K is provided at a location that is behind the communication hole 22B of the weather strip body 22 with respect to the vehicle, and the partition wall 24D is inserted into the insertion groove 22K. The groove width and the groove length of the insertion groove 22K are equal to the groove width TW and the groove length TL of the insertion groove 22J respectively.

Figure 11C:
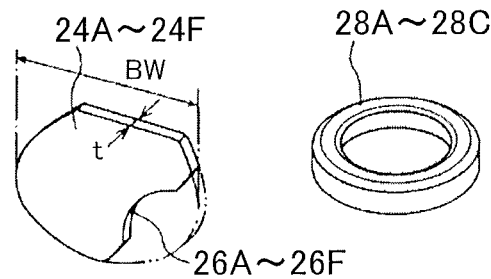
Figure 11D:
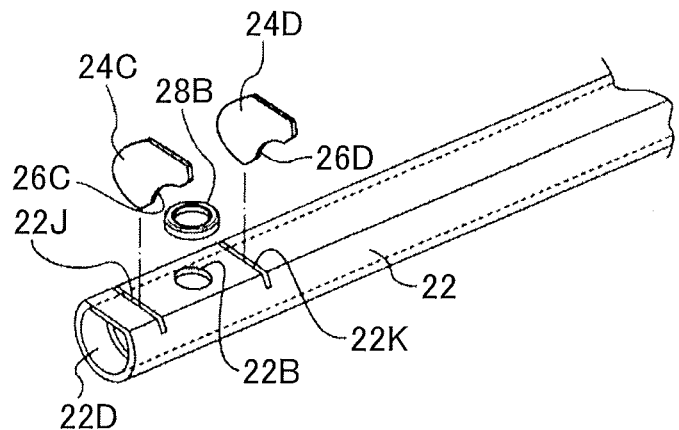

As shown in FIG. 11(C), the partition walls 24A to 24F that partition the inner space 22D of the weather strip body 22 and the ring-shaped sealing members (the sealing portions) 28A to 28C are formed through, for example, injection molding. The partition walls 24A to 24F are configured to be inserted into the insertion grooves 22J, 22K and the like of the weather strip body 22 respectively, and are designed as flat plates with no protrusive regions in order to enable smooth insertion. Furthermore, the drainage portions 26A to 26F that are obtained by notching parts of peripheral edge regions of the partition walls 24A to 24F and that penetrate to enable drainage are formed through the partition walls 24A to 24F respectively. The positions and opening areas of the drainage portions 26A to 26F are identical to the positions and opening areas of the drainage portions 26A to 26F shown in the foregoing FIG. 10(D), respectively.

As shown in FIGS. 8 and 11(D), the partition wall 24A is bonded and fixed to one end of the weather strip body 22 on the vehicle front side by an adhesive, and the partition wall 24F is bonded and fixed to the other end of the weather strip body 22 on the vehicle rear side by an adhesive. The partition wall 24C is inserted into the insertion groove 22J of the weather strip body 22. The partition wall 24C is bonded and fixed to the weather strip body 22 by an adhesive. Besides, the partition wall 24D is inserted into the insertion groove K of the weather strip body 22. The partition wall 24D is bonded and fixed to the weather strip body 22 by an adhesive. The other partition walls 24B and 24E are inserted into insertion grooves (not shown), and are bonded and fixed to the weather strip body 22 in the same manner by an adhesive. Furthermore, the sealing member 28A is bonded and fixed to the periphery of the communication hole 22A of the weather strip body 22. The sealing member 28B is bonded and fixed to the periphery of the communication hole 22B of the weather strip body 22. The sealing member 28C is bonded and fixed to the periphery of the communication hole 28C of the weather strip body 22.

When a series of these manufacturing processes end, the weather strip 20 manufactured according to the second manufacturing method is completed.

(Operation and Effect of First Embodiment)

With the vehicular door structure according to the first embodiment of the invention described above, the drainage holes 12H1 to 12H3 of the front side door body 12 communicate with the hollow interior 22D of the weather strip body 22 through the communication holes 22A to 22C respectively. Furthermore, the partition walls 24A to 24F of the hollow interior 22D are provided with the drainage portions 26A to 26F that partially penetrate the partition walls 24A to 24F to enable drainage, respectively. Therefore, the water and the like that have entered the hollow interior 22D of the weather strip body 22 through the drainage holes 12H1 to 12H3 of the front side door body 12 flow with the hollow interior 22D serving as a drainage channel, and can be drained from the drainage portion 26A or 26F at the end portion of the weather strip body 22 through the drainage portions 26B to 26E.

Figure 9:
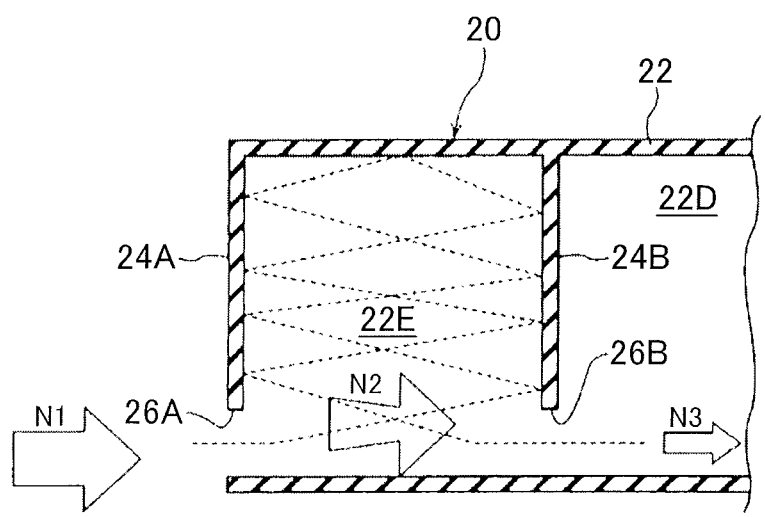
FIG. 9 is an enlarged cross-sectional view of an essential part of the weather strip shown in FIG. 8.

It should be noted herein that a sound (a noise) N1 generated on one end side of the weather strip 20 on the vehicle front side enters the expansion chamber 22E, which is constituted by the partition wall 24A and the partition wall 24B, through the drainage portion 26A of the partition wall 24A, as shown in FIGS. 8 and 9. In the expansion chamber 22E, the sound N1 is reflected by the partition wall 24A, the partition wall 24B, and an inner wall of the inner space 22D. Then, acoustic wave interference occurs, and a sound N2 attenuated (reduced) through this acoustic wave interference is generated. This sound N2 enters the expansion chamber 22F, which is constituted by the partition wall 24B and the partition wall 24C, from the expansion chamber 22E through the drainage portion 26B of the partition wall 24B. In the expansion chamber 22F, as is the case with the effect of sound attenuation in the expansion chamber 22E, the attenuated sound N2 is further attenuated through acoustic wave interference, so a sound N4 is generated. In the expansion chamber 22E, the two partition walls 24A and 24B form sound reflection surfaces that are substantially perpendicular to each other, and are arranged substantially parallel to each other. Therefore, acoustic wave interference occurs sufficiently, so the attenuation amplitude of the sound N2 increases. By the same token, in the expansion chamber 22F, the two partition walls 24B and 24C form sound reflection surfaces that are substantially perpendicular to each other, and are arranged substantially parallel to each other. Therefore, acoustic wave interference occurs sufficiently, so the attenuation amplitude of the sound N4 increases.

The sound N2 attenuated in the expansion chamber 22E passes through the drainage portion 26B of the partition wall 24B, and comes out through the communication hole 22A and the drainage hole 12H1 as a sound N3. The sound N3 then enters the door interior 12C of the front side door body 12. The sound N3 cannot be expected to be attenuated in the expansion chamber 22F, but has been sufficiently attenuated in the expansion chamber 22E. Therefore, the sound N3 enters the door interior 12C as a soft sound. By the same token, the sound N4 attenuated in the expansion chamber 22F passes through the drainage portion 26C of the partition wall 24C, and comes out through the communication hole 22B and the drainage hole 12H2 as a sound N5. The sound N5 then enters the door interior 12C of the front side door body 12. The sound N5 cannot be expected to be attenuated in the expansion chamber 22I, but has been sufficiently attenuated in the expansion chamber 22E and the expansion chamber 22F. Therefore, the sound N5 enters the door interior 12C as a softer sound.

On the other hand, an operation similar to the foregoing is obtained also from a sound N6 that is generated on the other end side of the weather strip body 22 on the vehicle rear side. That is, a sound N7 is attenuated by the expansion chamber 22H, and a sound N9 is attenuated by the expansion chamber 22G. Besides, a sound N8 enters the door interior 12C of the front side door body 12 through the communication hole 22C and the drainage hole 12H3, and a sound N10 enters the door interior 12C of the front side door body 12 through the communication hole 22B and the drainage hole 12H2.

Accordingly, with the vehicular door structure according to the first embodiment of the invention, an effect of making it possible to ensure the drainability by the weather strip 20 and enhance the effect of sound insulation for the sounds (the noises) N1 and N6 gaining entrance from the end portion of the weather strip 20 is obtained.

Besides, with the vehicular door structure according to the first embodiment of the invention, the weather strip body 22 is configured such that the partition walls 24A to 24F are provided in the hollow interior 22D. Therefore, it is difficult to manufacture the weather strip body 22 through extrusion or injection molding. It should be noted herein that the weather strip body 22 having no partition walls 24A to 24F in the hollow interior 22D can be easily manufactured through extrusion or injection molding according to the first manufacturing method shown in the foregoing FIGS. 10(A) to 10(E). This weather strip body 22 adopts a division structure, namely, is divided into the plurality of the weather strip bodies 22(1), 22(2) etc. in the longitudinal direction. Thus, the partition walls 24A to 24F can be provided at division locations among the weather strip bodies 22(1), 22(2) etc. Accordingly, the weather strip body 22 having the partition walls 24A to 24F can be easily manufactured.

Furthermore, with the second manufacturing method shown in the foregoing FIGS. 11(A) to 11(D), the weather strip body 22 having no partition walls 24A to 24F in the hollow interior 22D can be easily manufactured through extrusion or injection molding. This weather strip body 22 is equipped with the insertion grooves 22J and 22K etc. that penetrate from the outer peripheral surface thereof to the hollow interior 22D at the plurality of the locations from one end to the communication holes 22A to 22C respectively, and the partition walls 24A to 24F are inserted into the hollow interior 22D from these insertion grooves 22J and 22K etc. respectively. Accordingly, the weather strip body 22 having the partition walls 24A to 24F can be easily manufactured.

Accordingly, with the vehicular door structure according to the first embodiment of the invention, an effect of making it possible to easily manufacture the weather strip 20 is obtained.

Second Embodiment

Next, a vehicular door structure according to the second embodiment of the invention will be described using FIGS. 12 to 14. Incidentally, in the second embodiment of the invention and the following embodiments of the invention, components that are identical in function to those described in the first embodiment of the invention are denoted by the same reference symbols respectively. The description of these components denoted by the same reference symbols is redundant and hence is omitted.

(Configuration of Vehicular Door Structure)

Figure 12:
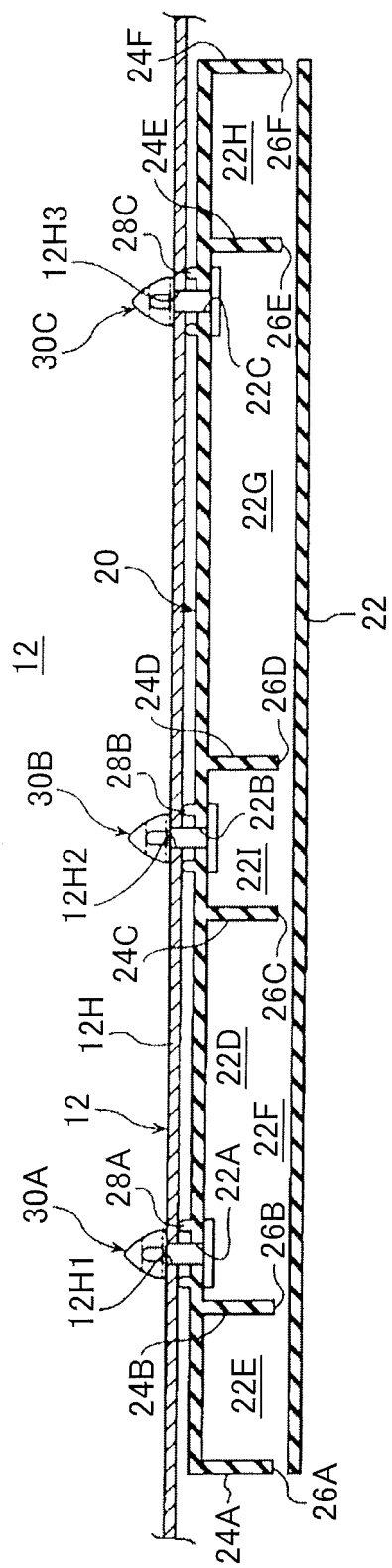
FIG. 12 is a cross-sectional view of a weather strip of a vehicular door structure according to a second embodiment of the invention, and corresponds to FIG. 8.
Figure 13:
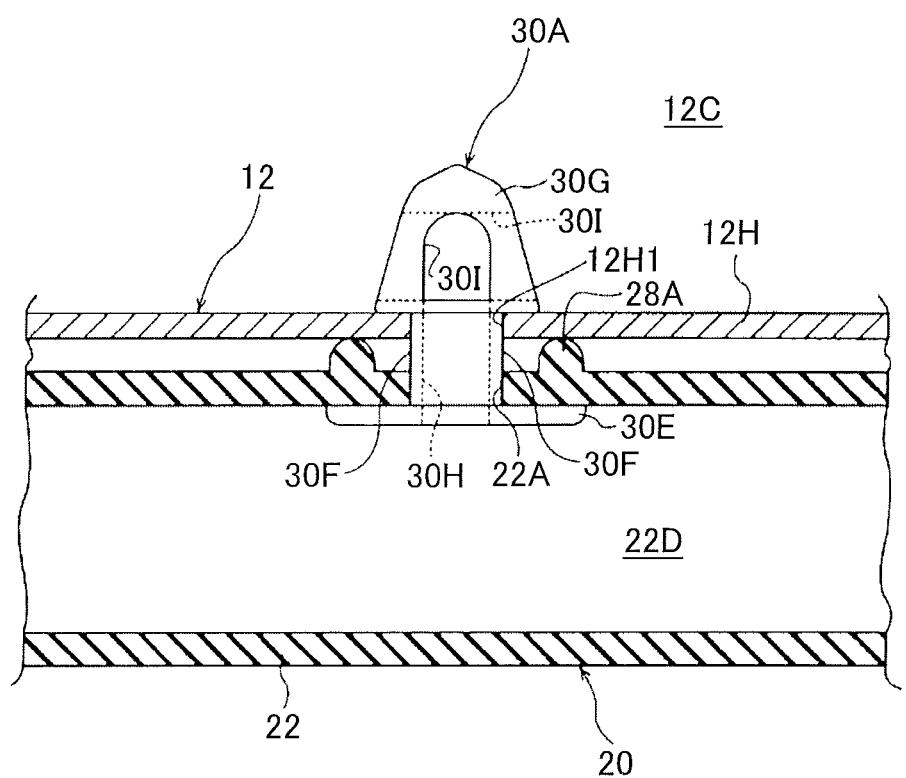
FIG. 13 is an enlarged cross-sectional view of an essential part of the weather strip shown in FIG. 12.
Figure 14A:
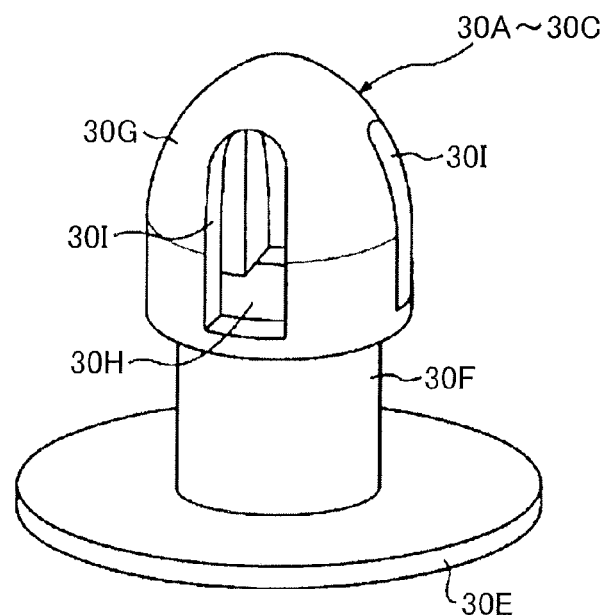
FIG. 14(A) is a perspective view of a clip for attaching the weather strip shown in FIG. 12 to a door body, as viewed diagonally downward from above.
Figure 14B:
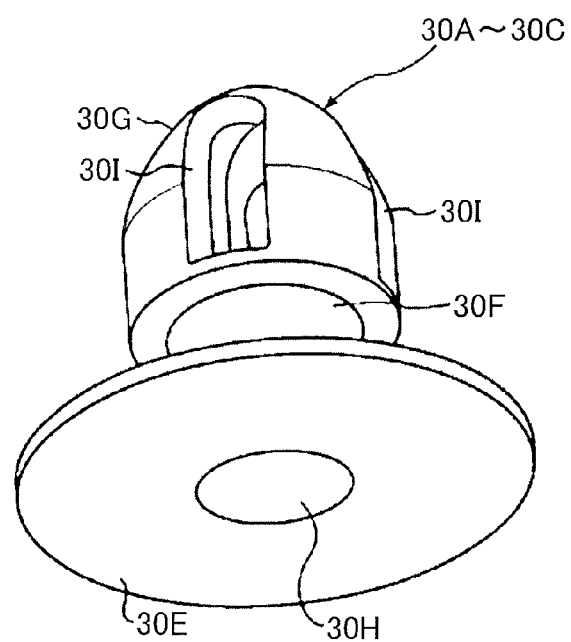
FIG. 14(B) is a perspective view of the clip, as viewed diagonally upward from below.

As shown in FIGS. 12 and 13, the vehicular door structure according to the second embodiment of the invention has a first primary through-hole 30H and a second primary through-hole 30I, and is provided with a clip 30A. The first primary through-hole 30H and the second primary through-hole 30I are penetrated from the drainage hole H1 of the front side door body 12 to the communication hole 22A of the weather strip 20, and enable drainage from the front side door body 12 to the weather strip body 22. The clip 30A clips the lower edge portion of the front side door body 12 and the weather strip body 22 via the drainage hole 12H1 and the communication hole 22A. Besides, a clip 30B that is similar in configuration to the clip 30A is provided at a location of the drainage hole 12H2 and the communication hole 22B. A clip 30C is provided at a location of the drainage hole 12H3 and the communication hole 22C.

Besides, the sealing portions 28A to 28C are provided between the lower edge portion of the front side door body 12 and the weather strip body 22 around the drainage holes 12H1 to 12H3 and the communication holes 22A to 22C respectively, as is the case with the vehicular door structure according to the first embodiment of the invention.

As shown in FIGS. 12, 13, 14(A) and 14(B), the clip 30A is equipped with a ring plate-like first engagement portion 30E, a hollow cylinder-like tube portion 30F, and a substantially mountain-like second engagement portion 30G. The first engagement portion 30E is engaged with the inner wall of the hollow interior 22D of the weather strip body 22. The tube portion 30F has the first primary through-hole 30H therein, which passes through the communication hole 22A and the drainage hole 12H1 from an upper end of the first engagement portion 30E, and is extended in the vehicle vertical direction. The second engagement portion 30G has the second primary through-hole 30I therein, which is provided at an upper end of the tube portion 30F, is engaged with the door interior 12C side of the second lateral wall 12H, is connected at one end thereof to the first primary through-hole 30H, and leads at the other end thereof to the door interior 12C.

The clip 30A is configured to clip the weather strip body 22 and the second lateral wall 12H via the sealing portion 28A, between the first engagement portion 30E and the second engagement portion 30G. That is, the lower edge portion of the front side door body 12 and the weather strip 20 are fixed to each other by being mechanically joined to each other by the clip 30A, instead of being fixed to each other with the aid of an adhesive.

The second primary through-hole 30I is configured as two drainage channels that intersect with each other in a cruciform manner as viewed from an axial direction of the tube portion 30F, and a cruciform intersection portion (a central portion) of this second primary through-hole 30I communicates with the first primary through-hole 30H. End portions of the second primary through-hole 30I that stretch in four directions in a cruciform manner open to the door interior 12C, and water and the like in the door interior 12C enter therefrom. This water and the like are drained into the inner space 22D of the weather strip body 22 through the first primary through-hole 30H.

The clip 30A is obtained by molding the first engagement portion 30E, the tube portion 30F, and the second engagement portion 30G integrally with one another through, for example, injection molding. The clip 30A is formed of a resin harder than, for example, the weather strip body 22. Both the clips 30B and 30C are similar in configuration to the clip 30A.

(Operation and Effect of Second Embodiment)

The vehicular door structure according to the second embodiment of the invention described above is provided with the clips 30A to 30C that clip the lower edge portion of the front side door body 12 and the weather strip body 22 via the drainage holes 12H1 to 12H3 and the communication holes 22A to 22C. The weather strip body 22 is fixed to the lower edge portion of the front side door body 12 by these clips 30A to 30C. The clips 30A to 30C are provided with the first primary through-hole 30H that penetrates the drainage holes 12H1 to 12H3 and the communication holes 22A to 22C. Therefore, the weather strip 20 can be reliably fixed to the lower edge portion of the front side door body 12, and drainage from the door interior 12D of the front side door body 12 to the weather strip 20 can be ensured.

Third Embodiment

Figure 16A:
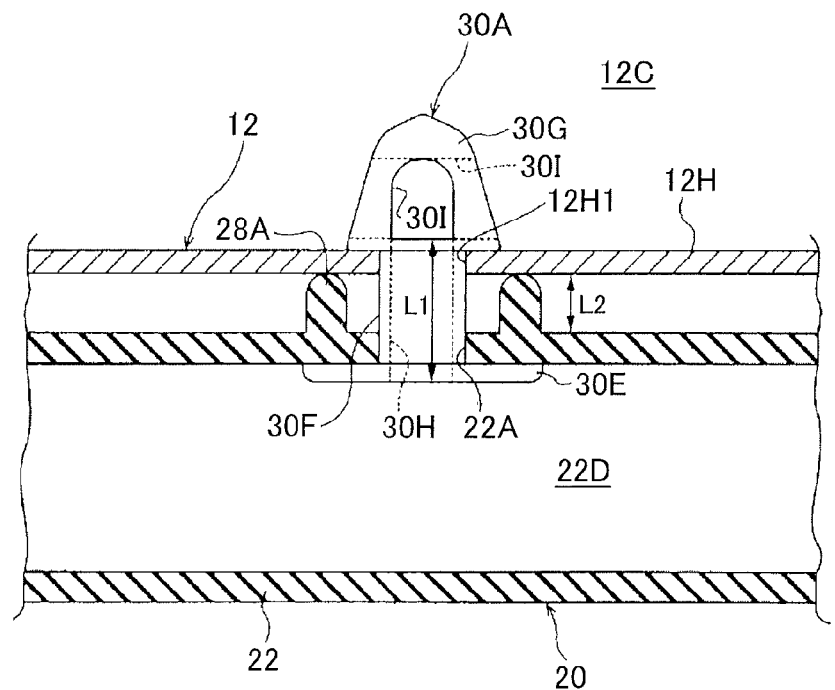
FIG. 16(A) is an enlarged cross-sectional view of an essential part of one end portion of the weather strip shown in FIG. 15.
Figure 16B:
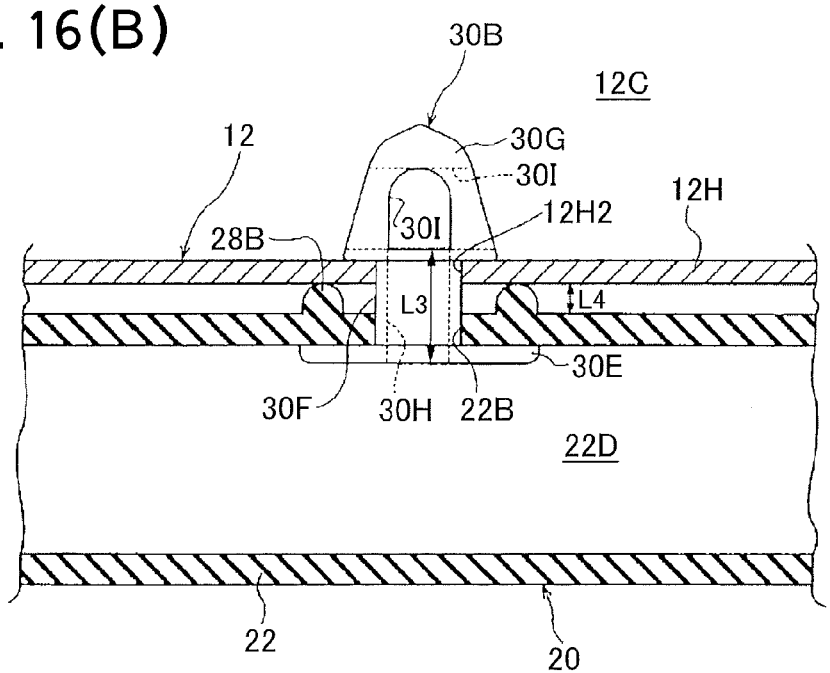
FIG. 16(B) is an enlarged cross-sectional view of an essential part of a central portion of the weather strip.
Figure 17A:
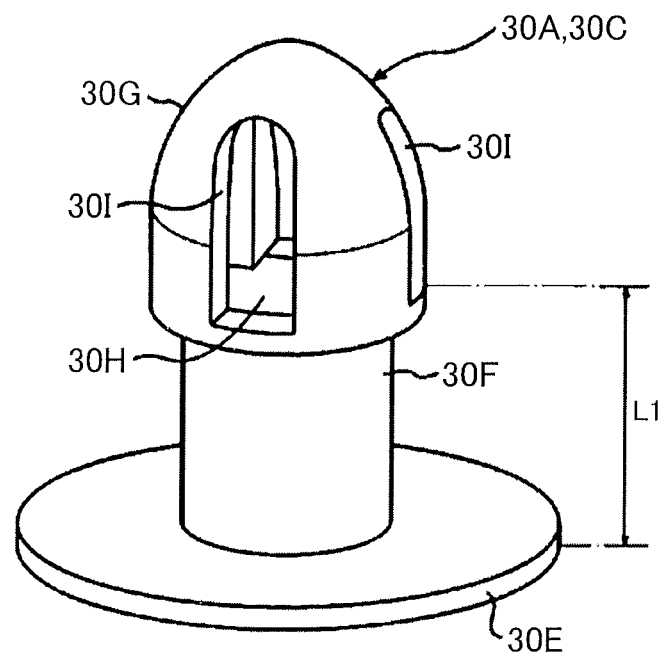
FIG. 17(A) is a perspective view of a clip shown in FIG. 16(A), as viewed diagonally downward from above.
Figure 17B:
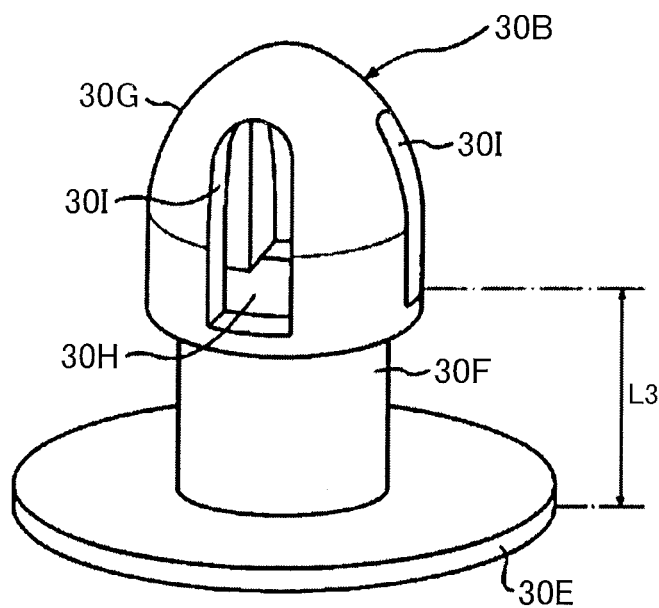
FIG. 17(B) is a perspective view of the clip shown in FIG. 16(B) as viewed diagonally downward from above.

Next, a vehicular door structure according to the third embodiment of the invention will be described using FIGS. 15 to 17. In the third embodiment of the invention, an example in which the drainage performance of the vehicular door structure according to the foregoing second embodiment of the invention is further enhanced will be described.

(Configuration of Vehicular Door Structure)

As shown in FIGS. 15, 16(A), 16(B), 17(A) and 17(B), with the vehicular door structure according to the third embodiment of the invention, a penetration length L3 of the clip 30B at the central portion in the vehicle longitudinal direction through the first primary through-hole 30H (or the tube portion 30F) in the vehicle vertical direction is set shorter than a penetration length L1 of the clips 30A and 30C at the front portion (one end portion) and the rear portion (the other end portion) in the vehicle longitudinal direction through the first primary through-hole 30H (or the tube portion 30F) in the vehicle vertical direction. In accordance with this difference in length, a spacing distance (or a height) L4 of the sealing portion 28B that is provided around the clip 30B is set shorter (or lower) than a spacing distance (or a height) L2 of the sealing portions 28A and 28C that are provided around the clips 30A and 30C. It should be noted herein that each of the spacing distances L2 and IA is a length between the lower edge portion of the front side door body 12 and the weather strip body 22 in the vehicle vertical direction.

The weather strip body 22 is inclined with a descending slope, through the use of these clips 30A to 30C. To be more precise, the weather strip body 22 is slightly curved downward with respect to the vehicle from the central portion thereof to both the ends (the end portions) thereof.

(Operation and Effect of Third Embodiment)

With the vehicular door structure according to the third embodiment of the invention, the lower edge portion of the front side door body 12 is fixed to one end portion and the other end portion of the weather strip body 22 by the clips 30A and 30C via the sealing portions 28A and 28C respectively, and the drainage holes 12H1 and 12H3 and the communication holes 22A and 22C communicate with each other through the first primary through-hole 30H of the clips 30A and 30C respectively. On the other hand, the lower edge portion of the front side door body 12 and the central portion of the weather strip body 22 are fixed to each other by the clip 30B via the sealing portion 28B that has a shorter spacing distance L4 than the sealing portions 28A and 28C. The second drainage hole 12H2 and the communication hole 22B communicate with each other through the first primary through-hole 30H that has a shorter penetration length L3 than the first primary through-hole 30H of the clips 30A and 30C. Therefore, the weather strip body 22 is inclined with a descending slope from the central portion thereof toward one end portion and the other end portion thereof, so drainage from the central portion of the weather strip body 22 toward one end portion and the other end portion thereof is reliably enabled. Accordingly, the vehicular door structure according to the third embodiment of the invention makes it possible to enhance the drainage performance of the weather strip 20.

Fourth Embodiment

Next, a vehicular door structure according to the fourth embodiment of the invention will be described using FIGS. 18 to 23. In the fourth embodiment of the invention, an example in which the effect of sound (noise) reduction by the clips 30A to 30C is enhanced in the vehicular door structure according to the foregoing second embodiment of the invention or the foregoing third embodiment of the invention will be described.

(Configuration of Vehicular Door Structure)

As shown in FIGS. 18 and 19, with the vehicular door structure according to the present embodiment of the invention as well as the vehicular door structure according to the foregoing second embodiment of the invention or the foregoing third embodiment of the invention, the sealing portion 28A is provided between the second lateral wall 12H of the lower edge portion of the front side door body 12 and the weather strip body 22, around the drainage hole 12H1 of the front side door body 12 and the communication hole 22A of the weather strip body 22. As shown in, for example, the foregoing FIG. 3, the sealing portion 28A substantially assumes the shape of a ring in a plan view of the vehicle. Therefore, the sealing portion 28A surrounds the entire peripheries of the drainage hole 12H1 and the communication hole 22A, and spaces the second lateral wall 12H and the weather strip body 22 apart from each other. An inner wall of the sealing portion 28A forms a closed space 32 that is sealed against a space outside the sealing portion 28A, in combination with a lower surface of the second lateral wall 12H on the weather strip body 22 side, the upper wall portion 22R of the weather strip body 22, and an outer peripheral surface of the tube portion 30F of the clip 30A.

On the other hand, the clip 30A for fixing the weather strip body 22 to the second lateral wall 12H is provided with the first primary through-hole 30H and the second primary through-hole 30I through which the door interior 12C of the front side door body 12 and the inner space 22D of the weather strip 20 communicate with each other. With the vehicular door structure according to the present embodiment of the invention, the clip 30A is further provided with a secondary through-hole 30M that leads to the closed space 32 from the first through-hole 30H. The first primary through-hole 30H is penetrated in the vehicle vertical direction, and the secondary through-hole 30M is penetrated in a horizontal direction that intersects with the penetration direction of the first through-hole 30H. It should be noted herein that the tube portion 30F is provided with the secondary through-hole 30M between the second lateral wall 12H and the weather strip body 22. While a size adjustment is appropriately carried out in accordance with the frequency of the sound (the noise) to be attenuated, the opening dimension (the diameter) of the secondary through-hole 30M is set smaller than the opening dimension (the diameter) of the first primary through-hole 30H. Besides, the opening dimension of the secondary through-hole 30M is set smaller than the spacing distance L2 (see FIG. 16(A)) of the sealing portion 28A. Incidentally, the clips 30B and 30C are identical in configuration to the clip 30A.

(Effect of Sound Reduction)

Figure 20:
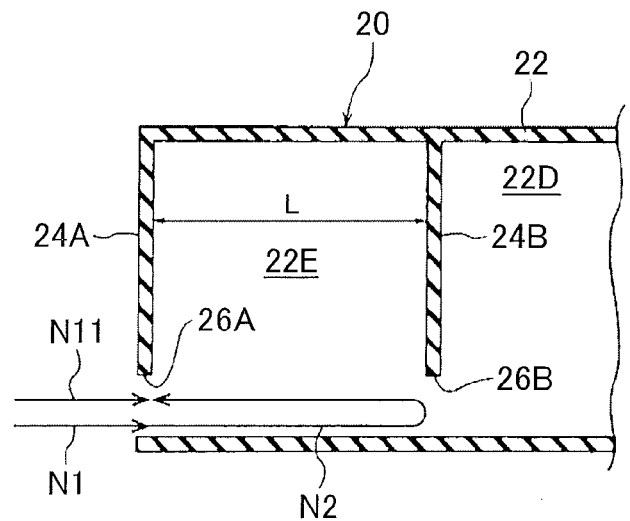
FIG. 20 is an enlarged cross-sectional view of an essential part of the weather strip for illustrating an effect of sound reduction, and corresponds to FIG. 18.

An effect of sound reduction by the clip 30A (and the clips 30B and 30C) will now be described. As shown in FIG. 20, upon entering the expansion chamber 22E, the sound N1 generated first in front of the weather strip 20 with respect to the vehicle is reflected by the partition wall 24B in, for example, the expansion chamber 22E, and turns into the sound N2. When the sound N2 collides with a sound N11 generated later in front of the weather strip 20 with respect to the vehicle, the effect of sound reduction differs depending on the wavelength and acoustic pressures (acoustic volumes) of the sounds N2 and N11.

Figure 21:
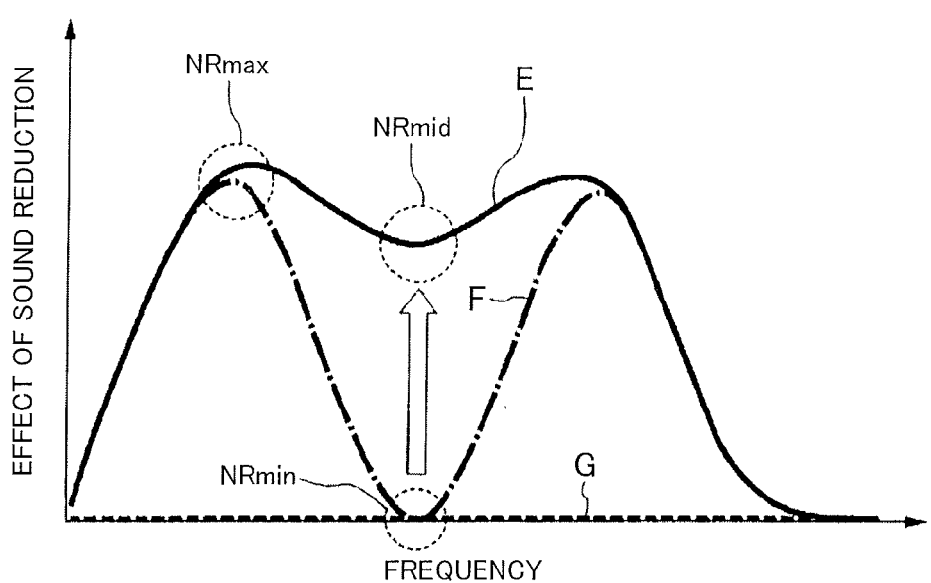
FIG. 21 is a graph showing a relationship between the frequency of a sound and the effect of sound reduction.

FIG. 21 shows a relationship between the frequency (Hz) of a sound and the effect of sound reduction (dB). A broken line denoted by a reference symbol G shown in FIG. 21 indicates a relationship between the frequency of a sound and the effect of sound reduction in a weather strip that is not equipped with the expansion chamber 22E of the vehicular door structure according to the invention. This weather strip is not provided with the partition walls 24A and 24B etc. that constitute the expansion chamber 22E and the like. Therefore, the sound N1 gaining entrance from one end of the weather strip directly passes through the door interior 12C of the front side door body 12 without acoustic wave interference. Therefore, the effect of sound reduction cannot be basically expected.

An alternate long and short dash line denoted by a reference symbol F shown in FIG. 21 indicates a relationship between the frequency of a sound and the effect of sound reduction in the weather strip 20 of the vehicular door structure according to the foregoing second embodiment of the invention or the foregoing third embodiment of the invention. With this weather strip 20, the sound N1 generated first and having gained entrance is reflected by the partition wall 24B and turns into the sound N2. If the phase of this sound N2 and the phase of the sound N11 generated later and having gained entrance are mutually inverted by 180° when the sound N2 collides with the sound N11, the sound N2 and the sound N11 are counterbalanced by each other, and the effect of sound reduction assumes a maximum value NRmax. In the case where the length of the expansion chamber 22E that coincides with the longitudinal direction of the weather strip body 22 shown in FIG. 20 is L, the condition on the frequency at which the sound is attenuated is defined by an expression (1) shown below.

[Expression 1]

$$2L = \lambda/2 \times m \quad (1)$$

It should be noted herein that $\lambda$ denotes a wavelength, and that m denotes an odd number.

Besides, when the phase of the sound N2 and the phase of the sound N11 are identical to each other (when the phase difference is 0 degree) in the weather strip 20, the sound N2 and the sound N11 are counterbalanced by each other, so the effect of sound reduction assumes a minimum value NRmin. That is, there are some cases where the effect of sound reduction cannot be obtained when the sounds N2 and N11 are in a certain frequency band. The condition on the frequency at which the sound is not attenuated is defined by an expression (2) shown below.

[Expression 2]

$$2L = \lambda/2 \times n \quad (2)$$

It should be noted herein that n denotes an even number.

Figure 22:
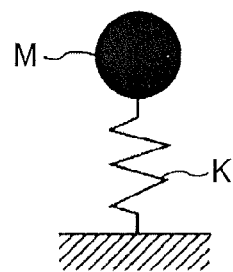
FIG. 22 is a model view of a spring-mass system with one degree of freedom.

FIG. 22 shows a model of a spring-mass system with one degree of freedom. With the vehicular door structure according to the present embodiment of the invention, as described above, the closed space 32 is provided between the second lateral wall 12H and the weather strip body 22. Furthermore, the clip 30A (or the clip 30B or the clip 30C) is provided with the secondary through-hole 30M. Owing to this configuration, there is structured "a spring-mass system with one degree of freedom" with the air in the closed space 32 serving as "a spring K" and with the air in the secondary through-hole 30M serving as "a mass M". When a sound passing through the first primary through-hole 30H of the clip 30A (e.g., the sound N3 shown in FIG. 8) hits the mass M, the spring K vibrates, so at least part of acoustic energy is converted into vibrational energy. Therefore, when the sound N1 gaining entrance from one end of the weather strip 20 passes through the clip 30A as the sound N3, this sound N3 can be effectively attenuated. Besides, when the sound N1 shown in the foregoing FIG. 8 passes through the clip 30B as the sound N5 as well, the sound N5 can be attenuated in the same manner. Besides, when the sound N6 passes through the clip 30C as the sound N8 as well, the sound N8 can be attenuated in the same manner. Furthermore, when the sound N6 passes through the clip 30B as the sound N10 as well, the sound N10 can be attenuated in the same manner.

A solid line denoted by a reference symbol E shown in FIG. 21 indicates a relationship between the frequency of a sound and the effect of sound reduction in the vehicular door structure according to the present embodiment of the invention. With this vehicular door structure, there is structured a spring-mass system with one degree of freedom. Therefore, the effect of sound reduction can be improved to an intermediate value NRmid especially in a frequency band where the effect of sound reduction assumes the minimum value NRmin. The frequency f at which the sound is attenuated is defined by an expression (3) shown below.

[Expression 3]

$$f = c/2\pi\sqrt{S/(l+\Delta l)V} \qquad (3)$$

It should be noted herein that c denotes an acoustic velocity (km/h), that l denotes a penetration length (mm) of the secondary through-hole 30M, that Δl denotes an opening end correction value (mm) of the secondary through-hole 30M, that S denotes an area (mm²) of the secondary through-hole 30M, and that V denotes a volume (mm³) of the closed space 32.

Figure 23:
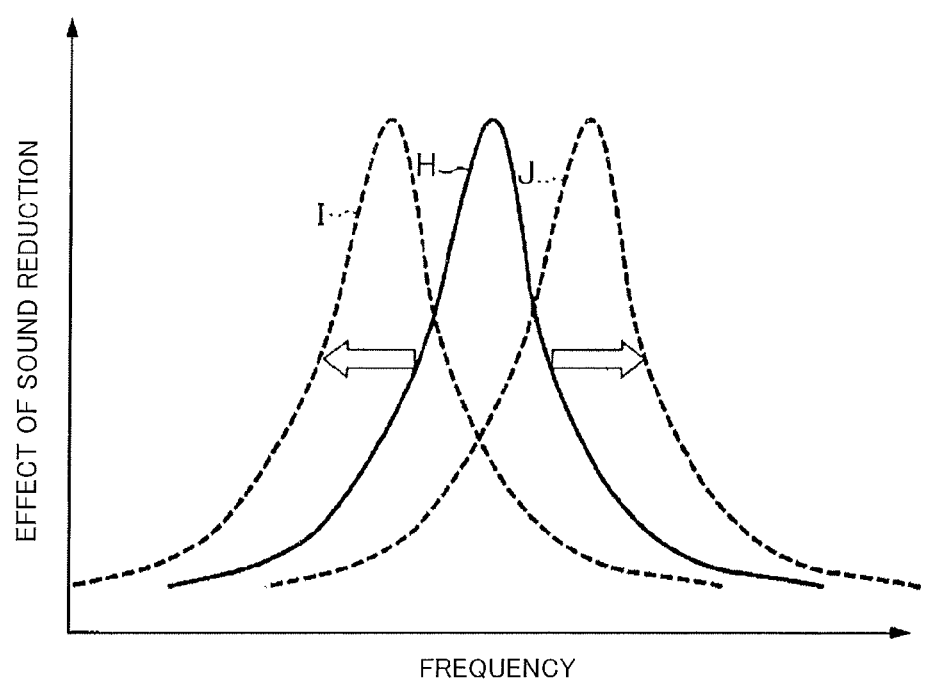
FIG. 23 is a graph showing a relationship between the frequency of a sound and the effect of sound reduction in a model of the spring-mass system with one degree of freedom.

FIG. 23 shows a relationship between the frequency (Hz) of a sound and the effect of sound reduction (dB) in the foregoing model of the spring-mass system with one degree of freedom. With the vehicular door structure according to the present embodiment of the invention, there is structured a spring-mass system with one degree of freedom. Therefore, when the vehicular door structure resonates at a specific frequency, a remarkable effect of sound reduction can be obtained. Besides, with the spring-mass system with one degree of freedom, the frequency at which an effect of sound reduction is obtained can be controlled by adjusting the ratio between the volume of the secondary through-hole 30M and the volume of the closed space 32. For example, if the volume of the closed space 32 is increased with the volume of the secondary through-hole 30M held constant (with the mass M held constant), the number of vibrations of the spring K decreases. Therefore, the resonance frequency shifts from a solid line denoted by, a reference symbol H toward the low frequency side indicated by a broken line denoted by a reference symbol I. On the contrary, if the volume of the closed space 32 is reduced with the volume of the secondary through-hole 30M held constant (with the mass M held constant), the number of vibrations of the spring K increases. Therefore, the resonance frequency shifts from the solid line denoted by the reference symbol H toward the high frequency side indicated by a broken line denoted by a reference symbol J.

(Operation and Effect of Fourth Embodiment)

With the vehicular door structure according to the fourth embodiment of the invention, there is structured "a spring-mass system with one degree of freedom" with the air in the closed space 32 serving as "the spring K" and with the air in the secondary through-hole 30M of the clips 30A to 30C serving as "the mass M". When the sound N3 (or the sound N5 or the sound N8 or the sound N10, see FIG. 8) passing through the first primary through-hole 30H of the clips 30A to 30C hits the mass M, the spring K vibrates. Therefore, at least part of acoustic energy is converted into vibrational energy. Therefore, when passing through the clips 30A to 30C, the sound N1 (or the sound N6) gaining entrance from one end portion (or the other end portion) of the weather strip 20 is effectively attenuated, and enters the door interior 12C of the front side door body 12, so the effect of noise insulation can be further enhanced. Besides, the sound N3 or the like is attenuated by the spring-mass system with one degree of freedom regardless of the frequency of the sound, so the effect of noise insulation can be stably obtained.

Accordingly, with the vehicular door structure according to the fourth embodiment of the invention, the effect of noise insulation can be further enhanced, and the effect of noise insulation can be stably obtained, in addition to the effect obtained by the vehicular door structure according to the second embodiment of the invention or the third embodiment of the invention.

Incidentally, with the vehicular door structure according to the present embodiment of the invention, the closed space 32 is not required to be provided entirely around the tube portion 30F of the clips 30A to 30C. That is, the closed space 32 linked with the secondary through-hole 30M may be provided at least partially around the tube portion 30F.

Fifth Embodiment

Next, a vehicular door structure according to the fifth embodiment of the invention will be described using FIGS. 24 to 34. In the fifth embodiment of the invention, an example in which the cross-sectional shape of the weather strip 20 is changed in the vehicular door structure according to each of the foregoing first to fourth embodiments of the invention will be described.

(Configuration of Weather Strip)

Figure 24:
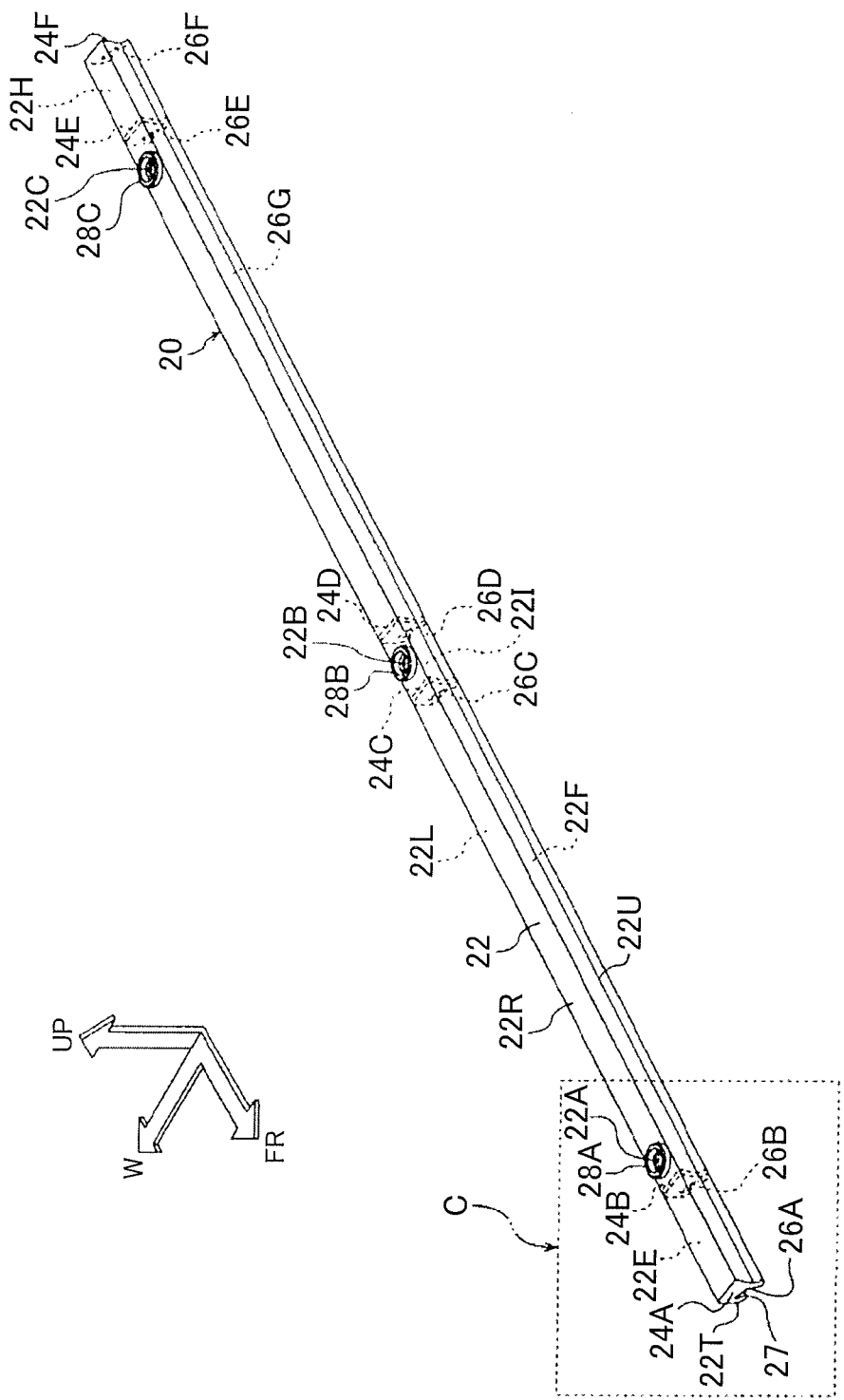
FIG. 24 is a perspective view of a weather strip for a vehicular door structure according to a fifth embodiment of the invention, and corresponds to FIG. 2.
Figure 25:
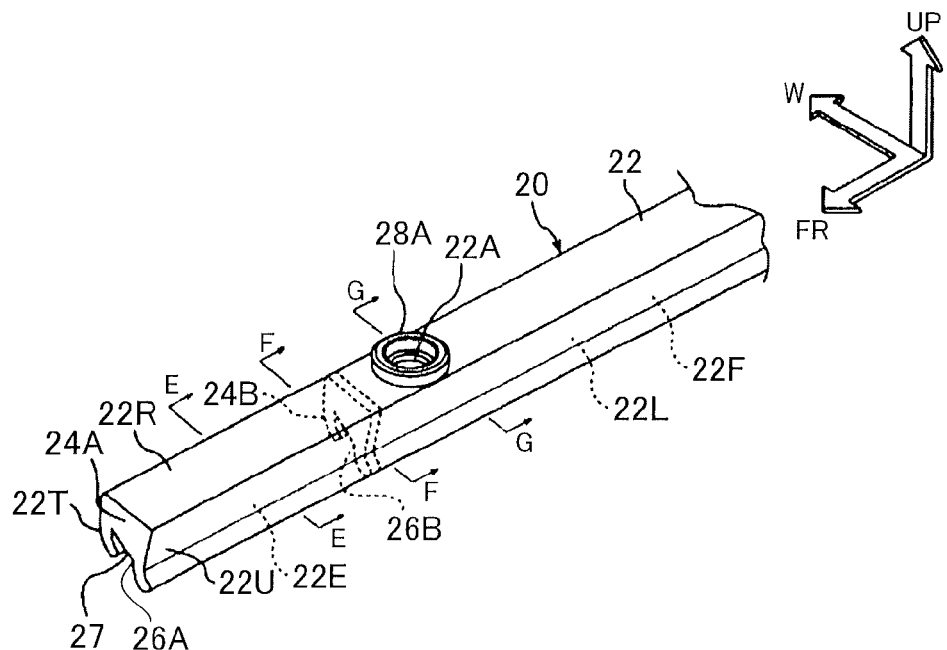
FIG. 25 is an enlarged perspective view of the weather strip shown in FIG. 24 in a region that is denoted by a reference symbol C and surrounded by a broken line.
Figure 26:
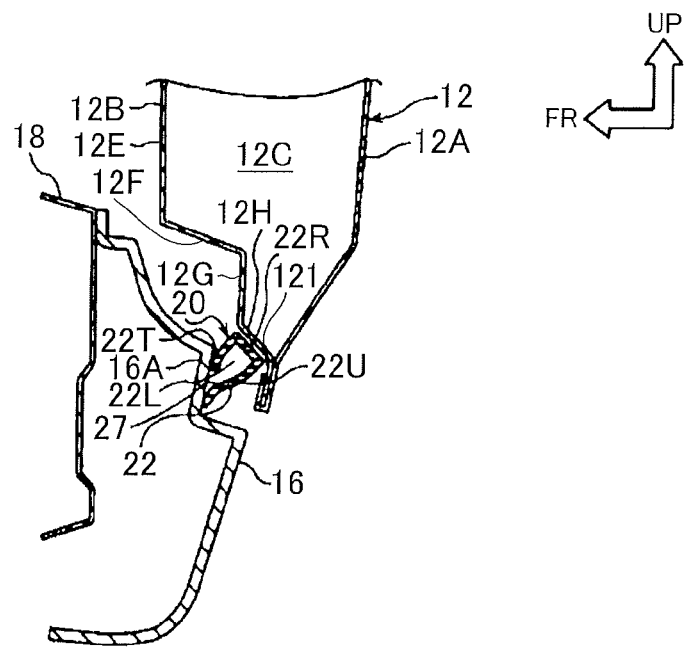
FIG. 26 is a cross-sectional view of a door body taken along a cutting line E-E of the weather strip shown in FIG. 25, as viewed from a vehicle front side toward a vehicle rear side.
Figure 27:
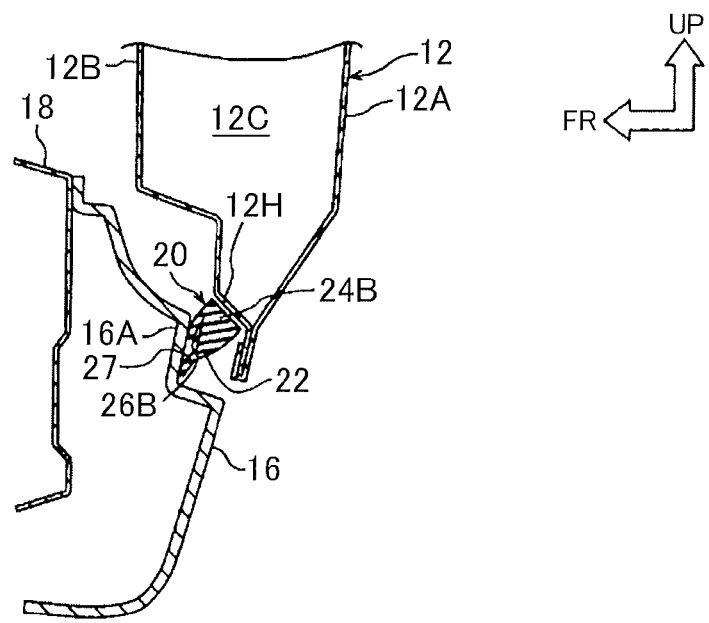
FIG. 27 is a cross-sectional view of the door body taken along a cutting line F-F of the weather strip shown in FIG. 25, as viewed from the vehicle front side toward the vehicle rear side.
Figure 28:
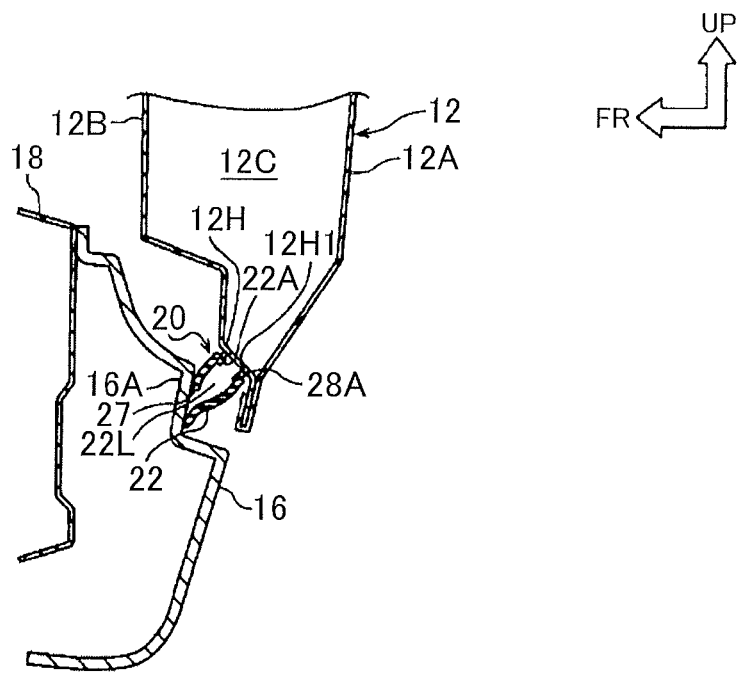
FIG. 28 is a cross-sectional view of the door body taken along a cutting line G-G of the weather strip shown in FIG. 25, as viewed from the vehicle front side toward the vehicle rear side.
Figure 31:
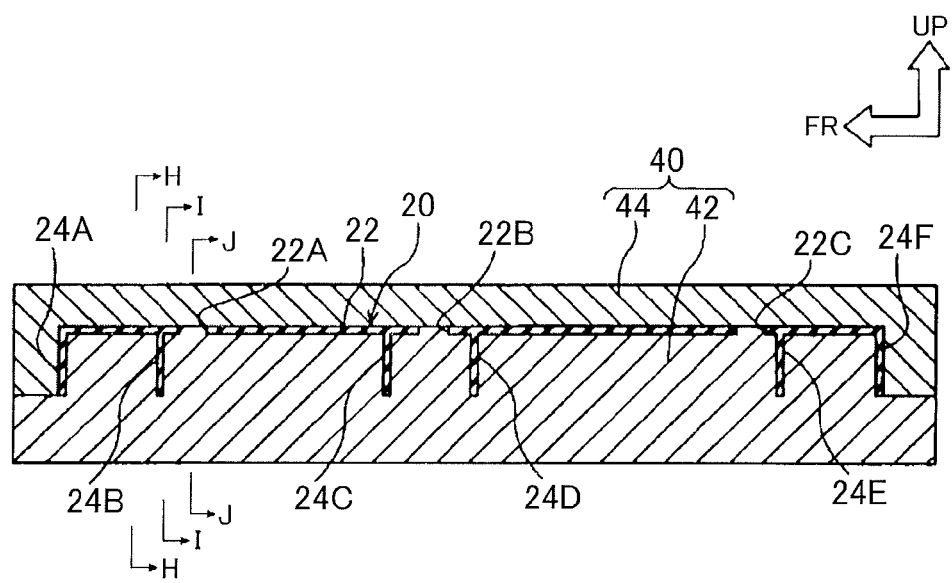
FIG. 31 is a cross-sectional view of a die in an injection molding process and the weather strip shown in FIG. 24, for illustrating a molding method, and corresponds to FIG. 8.
Figure 32:
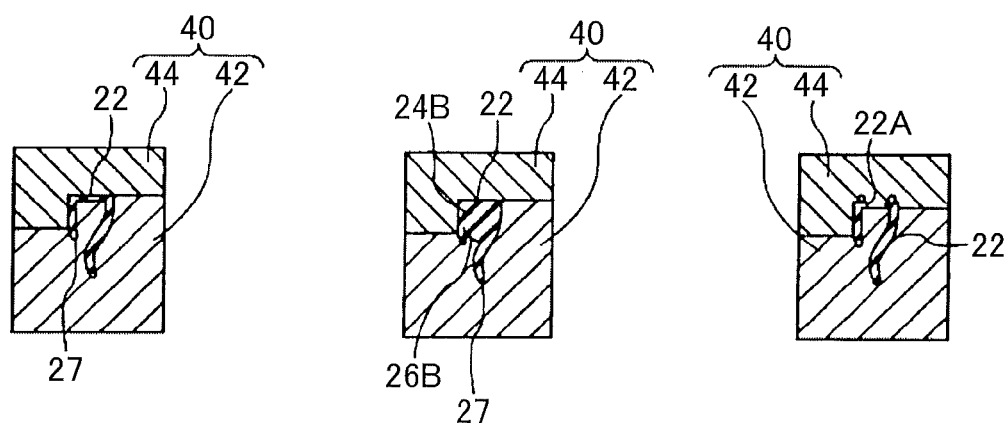
FIG. 32(A) is a cross-sectional view of the die and the weather strip taken along a cutting line H-H shown in FIG. 31.
FIG. 32(B) is a cross-sectional view of the die and the weather strip taken along a cutting line I-I shown in FIG. 31.
FIG. 32(C) is a cross-sectional view of the die and the weather strip taken along a cutting line J-J shown in FIG. 31.

As shown in FIGS. 24 and 25, with the vehicular door structure according to the present embodiment of the invention, the weather strip body 22 of the weather strip 20 is equipped with an open cross-section interior 22L except at the locations where the communication holes 22A to 22C are formed. As is the case with the foregoing hollow interior 22D, this open cross-section interior 22L is a drainage channel of the water and the like drained through the drainage holes 12H1 to 12H3 and the communication holes 22A to 22C.

As shown in FIGS. 24 to 28, the weather strip body 22 is equipped with a substantially flat upper wall portion 22R, a first longitudinal wall portion 22T that extends downward with respect to the vehicle from an inner side of the upper wall portion 22R with respect to the vehicle, and a second longitudinal wall portion 22U that extends downward with respect to the vehicle from an outer end of the upper wall portion 22R with respect to the vehicle substantially parallel to the first longitudinal wall portion 22T and longer than the first longitudinal wall portion 22T. An open portion 27 is formed between a lower end of the first longitudinal wall portion 22T and a lower end of the second longitudinal wall portion 22U. That is, the weather strip body 22 is configured such that the cross-section thereof assumes an inverted L shape as viewed from the vehicle front side toward the vehicle rear side.

The weather strip body 22 is provided, at a plurality of locations in the longitudinal direction thereof, with the plurality of the partition walls 24A to 24F that partition the weather strip body 22 in a direction intersecting with this longitudinal direction (in this case, in a direction perpendicular thereto). The plurality of these partition walls 24A to 24F are provided with the drainage portions 26A to 26F that penetrate in the longitudinal direction to enable drainage, respectively. With the weather strip 20 of the vehicular door structure according to the present embodiment of the invention as well as the weather strip 20 of the vehicular door structure according to the first embodiment of the invention, the partition walls 24A to 24F are arranged in this order from one end portion on the vehicle front side toward the other end portion on the vehicle rear side. Besides, the two partition walls 24A and 24B are provided between one end of the weather strip body 22 and the communication hole 22A, and the three partition walls 24A, 24B and 24C are provided between one end and the communication hole 22B. On the other hand, the two partition walls 24F and 24E are provided between the other end of the weather strip body 22 and the communication hole 22C, and the three partition walls 24F, 24E and 24D are provided between the other end and the communication hole 22B. Besides, the expansion chambers 24E to 24I are formed by the plurality of the partition walls 24A to 24F respectively. With the vehicular door structure according to the present embodiment of the invention, the partition walls 24A to 24F are configured integrally with the inner wall of the weather strip body 22. This manufacturing method will be described later.

The sealing portion 28A is provided between the upper wall portion (the upper surface portion) 22R of the weather strip body 22 and the second lateral wall 12H of the door inner panel 12B around the communication hole 22A. As is the case with the sealing portion 28A of the vehicular door structure according to the first embodiment of the invention, the sealing portion 28A of the vehicular door structure according to the present embodiment of the invention assumes a ring-like shape in a plan view of the vehicle, and is formed of the same material as that of the weather strip body 22. Furthermore, the sealing portion 28A is configured integrally with the weather strip body 22. By the same token, the sealing portion 28B is provided between the weather strip body 22 and the second lateral wall 12H around the communication hole 22B, and the sealing portion 28C is provided between the weather strip body 22 and the second lateral wall 12H around the communication hole 22C.

(Closing Performance of Door)

FIG. 29(A) shows a simplified model of the weather strip 20 having the shape of a closed cross-section of the vehicular door structure according to the foregoing first embodiment of the invention. FIG. 29(B) shows a beam model that is substituted for the model shown in FIG. 29(A). As shown in FIG. 29(A), when the front door opening 10A is closed down by the front side door body 12, a force F1 from the rocker molding 16 is applied to the weather strip body 22 outward from the inner side in the vehicle width direction. As shown in FIG. 29(B), this state is replaced with a model of a double-supported beam (a double end-supported beam) with one end of the weather strip body 22 supported by a support end S1 (e.g., the front side door body 12) and with the other end of the weather strip body 22 supported by a support end S2 (e.g., the rocker molding 16). A spring constant k (N/mm) of this double-supported beam is defined by an expression (4) shown below.

[Expression 4]

$$k = 192EI/l^3 \qquad (4)$$

It should be noted herein that EI denotes a bending rigidity (Nmm²), and that l denotes a length (mm) of the beam.

FIG. 30(A) shows a simplified model of the weather strip 20 having an open cross-sectional shape of the vehicular door structure according to the present embodiment of the invention. FIG. 30(B) shows a beam model that is substituted for the model shown in FIG. 30(A). As shown in FIG. 30(A), when the front door opening 10A is closed down by the front side door body 12, the force F1 from the rocker molding 16 is applied to the weather strip body 22 outward from the inner side in the vehicle width direction. As shown in FIG. 30(B), since the weather strip 20 is provided with an open portion 27, this state is replaced with a model of a cantilever beam (a single end-supported beam denoted by a reference numeral 20(1)) with one end of the weather strip 20 supported by the support end S1 and a cantilever beam (a single end-supported beam denoted by a reference numeral 20(2)) with the other end of the weather strip 20 supported by the support end S2. A force F2 equal to half of the force F1 is applied to each of these two cantilever beams. The spring constant k (N/mm) of each of the cantilever beams is defined by an expression (5) shown below.

[Expression 5]

$$k = 12EI/l^3 \qquad (5)$$

The spring constant k is equivalent to the reactive force. The reactive force of the weather strip body 22 of the vehicular door structure according to the present embodiment of the invention is smaller than, that is, is equal to one-sixteenth of the reactive force of the weather strip body 22 of the vehicular door structure according to the first embodiment of the invention. Therefore, when the front door opening 10A is closed down by the front side door body 12, the reactive force of the weather strip 20 is dramatically small, so the door closing performance of the front side door body 12 can be enhanced. As described above, the front side door body 12 has been described herein. If the rear side door body 14 is provided with the weather strip 20 having the open portion 27, the door closing performance of this rear side door body 14 can also be enhanced.

(Method of Manufacturing Weather Strip)

A method of manufacturing the weather strip 20 according to the present embodiment of the invention is as follows. As shown in FIGS. 31 and 32(A) to 32(C), the weather strip 20 is formed through injection molding with the aid of a die 40 having a first die (a lower die) 42 and a second die (an upper die) 44. That is, a polymer elastic material as a material of the weather strip body 22 is injected into a cavity (a mold) for molding the weather strip body 22 between the first die 42 and the second die 44 that is placed thereon in combination therewith. In this case, the weather strip body 22, the communication holes 22A to 22C, the partition walls 24A to 24F, the drainage portions 26A to 26F, and the sealing portions 28A to 28C are molded at the same time. That is, the partition walls 24A to 24F and the sealing portions 28A to 28C are molded integrally with the weather strip body 22. Incidentally, dwelling and cooling are sequentially carried out after the polymer elastic material is injected.

Figure 33:
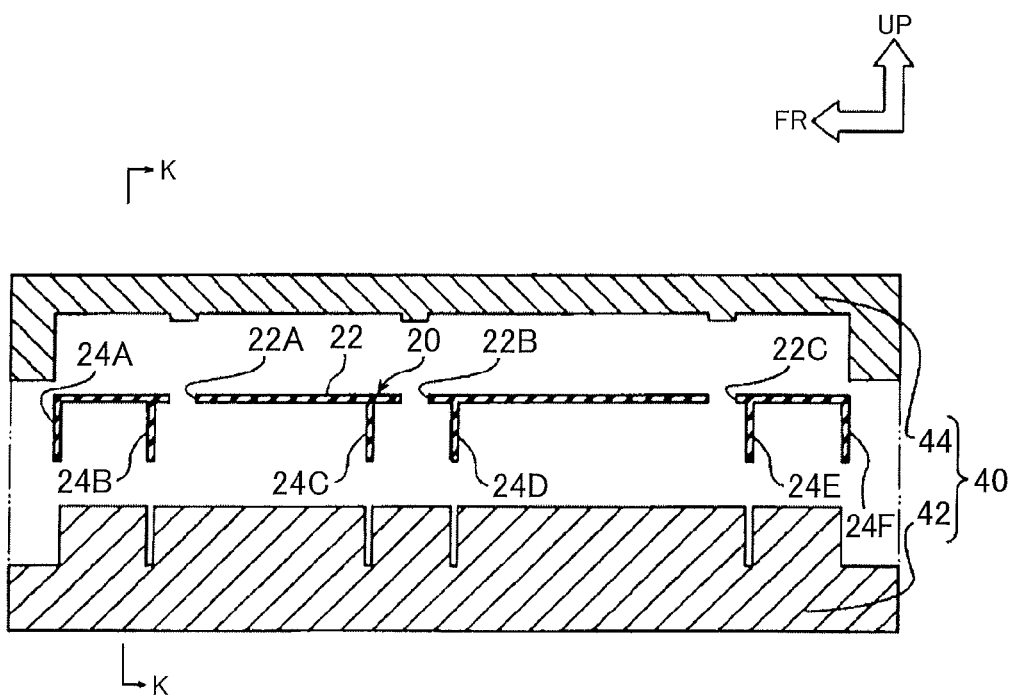
FIG. 33 is a cross-sectional view of the die and the weather strip in a parting process, and corresponds to FIG. 31.
Figure 34:
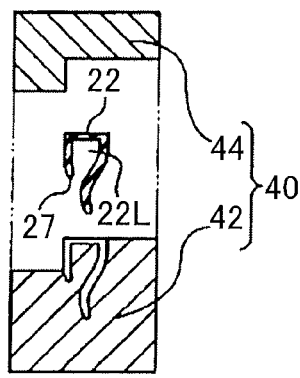
FIG. 34 is a cross-sectional view of the die and the weather strip taken along a cutting line K-K shown in FIG. 33.

As shown in FIGS. 33 and 34, the die 40 is opened after being cooled, and the molded weather strip 20 is taken out. This manufacturing method makes it possible to form the weather strip 20 in which the weather strip body 22, the communication holes 22A to 22C, the partition walls 24A to 24F, the drainage portions 26A to 26F, and the sealing portions 28A to 28C are integrally formed.

(Operation and Effect of Fifth Embodiment)

With the vehicular door structure according to the fifth embodiment of the invention, an operation similar to that obtained by the vehicular door structure according to each of the foregoing first to fourth embodiments of the invention can be obtained. Furthermore, with the vehicular door structure according to the present embodiment of the invention, the weather strip body 22 has an open cross-sectional shape.

It should be noted herein that since the spring constant of the weather strip body 22 having an open cross-sectional shape is smaller than the spring constant of the weather strip body 22 having a closed cross-sectional shape, the reactive force of the former is smaller than the reactive force of the latter. Therefore, the reactive force from the weather strip body 22 is made small when the front door opening 10A is closed down by the front side door body 12, so the closing performance of the front side door body 12 can be enhanced.

Besides, the vehicular door structure according to the fifth embodiment of the invention has a simple structure in which the partition walls 24A to 24F are configured integrally with the open cross-section interior 22L of the weather strip body 22. In addition, the vehicular door structure according to the fifth embodiment of the invention has a simple structure in which the sealing portions 28A to 28C are configured integrally with the upper wall portion 22R of the weather strip body 22. Therefore, the weather strip 20 can be easily manufactured. For example, as described above, the die 40 having the first die 42 for molding the inner wall of the open cross-section interior 22L of the weather strip body 22 and the contours of the partition walls 24A to 24F and the second die 44 for molding the outer wall of the weather strip body 22 is manufactured, and the material of the weather strip body 22 is injected into the space between this first die 42 and this second die 44 to be molded. Thus, the weather strip 20 can be manufactured by carrying out injection molding once.

Supplementary Description of Aforementioned Embodiments

The invention is not limited to the aforementioned embodiments thereof, but can be changed in various manners without departing from the gist thereof. For example, the invention is applicable to a vehicular door structure that is equipped with a weather strip provided on a back door of a hatchback-type vehicle. Besides, the invention is applicable to a vehicular door structure that is equipped with a weather strip provided on a slidable door body.

The invention claimed is:

1. A vehicular door structure comprising:
a door body that is provided with a drainage hole at a lower edge portion thereof;
a weather strip body that is arranged along the lower edge portion, that has a hollow interior, and that also has a communication hole through which the interior and the drainage hole communicate with each other; and
partition walls that are provided at a plurality of locations from an end portion of the weather strip body to the communication hole, and that partition the interior,
wherein the partition walls are provided with drainage portions that penetrate the partition walls to enable drainage,
wherein the weather strip body has a division structure that is divided in a longitudinal direction between the end portion and the communication hole, and the partition walls are provided at division positions of the weather strip body respectively, and
wherein the weather strip body is configured to be separable at the division positions.

2. The vehicular door structure according to claim 1, wherein
the weather strip body is equipped, between the end portion and the communication hole, with an insertion groove that penetrates from an outer peripheral surface to the interior, and
the insertion groove configured to receive the partition walls for insertion into the interior.

3. The vehicular door structure according to claim 1, wherein
the lower edge portion has a lateral wall as a flat surface, and
the weather strip body is constituted of an upper wall portion as a flat surface that is attached to the lateral wall, and a curved wall portion that assumes an arc shape.

4. The vehicular door structure according to claim 1, wherein
the drainage portions are provided on a lowest side of the weather strip body with respect to the vehicle, in a state of being attached to the door body.

5. The vehicular door structure according to claim 1, further comprising:
a clip that has a primary through-hole that penetrates from the drainage hole to the communication hole to enable drainage from the door body to the weather strip body, and that clips the lower edge portion and the weather strip body via the drainage hole and the communication hole.

6. The vehicular door structure according to claim 5, wherein
the clip is equipped with a first engagement portion that is engaged with the weather strip body, a tube portion that is extended upward with respect to the vehicle from the first engagement portion and that has the primary through-hole therein, and a second engagement portion that is provided at an upper end of the tube portion and that is engaged with the lower edge portion, and
the first engagement portion, the tube portion, and the second engagement portion are molded integrally with one another.

7. The vehicular door structure according to claim 1, further comprising:
a first sealing portion;
a second sealing portion;
a first clip; and
a second clip, wherein
the drainage hole is a plurality of drainage holes including a first drainage hole and a second drainage hole that are disposed at a plurality of locations along the lower edge portion,
the communication hole is a plurality of communication holes including first communication hole that is arranged at the end portion of the weather strip body and that communicates with the first drainage hole, and a second communication hole that is arranged at a central portion of the weather strip body and that communicates with the second drainage hole,
the first sealing portion seals peripheries of the first drainage hole and the first communication hole between the lower edge portion and the end portion,
the second sealing portion seals peripheries of the second drainage hole and the second communication hole between the lower edge portion and the central portion, and has a shorter spacing distance between the lower edge portion and the weather strip body than the first sealing portion,
the first clip has a first primary through-hole that penetrates from the first drainage hole to the first communication hole to enable drainage from the door body to the weather strip body, and clips the lower edge portion and the end portion via the first drainage hole and the first communication hole, and
the second clip has a second primary through-hole that penetrates from the second drainage hole to the second communication hole to enable drainage from the door body to the weather strip body, has a second primary through-hole that has a shorter penetration length than the first primary through-hole, and clips the lower edge portion and the central portion via the second drainage hole and the second communication hole.

8. The vehicular door structure according to claim 1, further comprising:
- a sealing portion that seals peripheries of the drainage hole and the communication hole between the lower edge portion and the weather strip body, and that forms a closed space between the lower edge portion and the weather strip body; and
- a clip that has a primary through-hole that penetrates from the drainage hole to the communication hole to enable drainage from the door body to the weather strip body, and a secondary through-hole that penetrates from the primary through-hole to the closed space, the clip clipping the lower edge portion and the weather strip body via the drainage hole and the communication hole.

9. A vehicular door structure comprising:
- a door body that is provided with a drainage hole at a lower edge portion thereof;
- a weather strip body that is arranged along the lower edge portion, that has a hollow interior, that also has a communication hole through which the interior and the drainage hole communicate with each other, and that has an open cross-section in a direction intersecting with a longitudinal direction except at a location where the communication hole is formed; and
- partition walls that are provided at a plurality of locations from an end portion of the weather strip body to the communication hole, and that partition the interior, wherein
- the partition walls are provided with drainage portions that penetrate the partition walls to enable drainage,
- wherein the weather strip body has a division structure that is divided in a longitudinal direction between the end portion and the communication hole and the partition walls are provided at division positions of the weather strip body respectively, and
- wherein the weather strip body is configured to be separable at the division positions.

10. The vehicular door structure according to claim 9, wherein
- the lower edge portion has a lateral wall as a flat surface, and
- the weather strip body is equipped with a flat upper wall portion that is attached to the lateral wall, a first longitudinal wall portion that extends downward with respect to the vehicle from a vehicle inner end of the upper wall portion, and a second longitudinal wall portion that extends downward with respect to the vehicle from a vehicle outer end of the upper wall portion parallel to the first longitudinal wall portion.

11. The vehicular door structure according to claim 9, wherein
- the partition walls are provided integrally with the weather strip body.

* * * * *